US009756980B1

(12) United States Patent
Li et al.

(10) Patent No.: US 9,756,980 B1
(45) Date of Patent: Sep. 12, 2017

(54) INVERTIBLE ELECTRIC ROASTING OVEN AND METHOD OF USE

(71) Applicants: George T. C. Li, Reno, NV (US); Eric Li, Reno, NV (US)

(72) Inventors: George T. C. Li, Reno, NV (US); Eric Li, Reno, NV (US)

(*) Notice: Subject to any disclaimer, the term of this patent is extended or adjusted under 35 U.S.C. 154(b) by 0 days.

(21) Appl. No.: 15/164,173

(22) Filed: May 25, 2016

Related U.S. Application Data

(63) Continuation-in-part of application No. 15/058,297, filed on Mar. 2, 2016.

(51) Int. Cl.
*A47J 36/06* (2006.01)
*A47J 37/06* (2006.01)
*A23L 5/10* (2016.01)

(52) U.S. Cl.
CPC ............ *A47J 37/0629* (2013.01); *A23L 5/15* (2016.08); *A47J 36/06* (2013.01); *A23V 2002/00* (2013.01)

(58) Field of Classification Search
None
See application file for complete search history.

(56) References Cited

U.S. PATENT DOCUMENTS

| | | | | |
|---|---|---|---|---|
| 1,969,878 A * | 8/1934 | Dumas | ...................... | H05B 3/68 219/436 |
| 2,149,131 A * | 2/1939 | Brumme | ................ | A47J 37/015 219/436 |
| 2,183,866 A * | 12/1939 | Hutchens | ............... | A47J 37/015 219/436 |
| 2,188,757 A * | 1/1940 | Moon | .................. | A47J 37/0623 219/450.1 |
| 2,269,480 A * | 1/1942 | Rehm | .................... | A47J 37/103 126/275 R |
| 2,342,692 A * | 2/1944 | Rehm | ...................... | A47J 37/00 126/275 R |
| 2,397,478 A * | 4/1946 | Drechsler | ............. | A47J 37/015 126/275 R |
| 2,497,241 A * | 2/1950 | Spigel | ................... | A47J 37/103 219/402 |
| 3,666,499 A * | 5/1972 | Isnor | ....................... | A23L 7/187 220/202 |
| 2016/0007622 A1* | 1/2016 | Bowyer | .................. | A47J 37/07 99/482 |

* cited by examiner

Primary Examiner — Joseph M Pelham
(74) Attorney, Agent, or Firm — Kerr IP Group, LLC

(57) ABSTRACT

An invertible roasting oven, cooking apparatus, and method of cooking with a cooking apparatus are described. In various embodiments, the invertible roasting oven may include a double walled dome lid having an inner wall and an outer wall, a heating element that is disposed within the double walled dome lid between the inner wall and the outer wall, and a shallow pan that interfaces with the double walled dome lid. The shallow pan may be configured to function as a base to the double walled dome lid in a first mode of operation and as a cover to the double walled dome lid in a second mode of operation. The invertible roasting oven may further include a cradle that receives the double walled dome lid when the cooking apparatus is operating in the second mode of operation.

14 Claims, 27 Drawing Sheets

INVERTIBLE ELECTRIC ROASTING OVEN AND METHOD OF USE

CROSS-REFERENCE

This patent application is a continuation-in-part of non-provisional patent application Ser. No. 15/058,297 entitled ELECTRIC ROASTING OVEN HAVING A DOMED LID AND METHOD OF USE, filed Mar. 2, 2016.

FIELD

The present disclosure relates to an electric roasting apparatus and method of use. More particularly, the present disclosure relates to an invertible electric roasting oven and method of use.

BACKGROUND

A variety of stand-alone roasting ovens have been developed to roast different food products (e.g., turkey, chicken, and the like) without the use of a conventional kitchen oven. These stand-alone roasting ovens are also referred to as "roaster ovens" or "roasters."

Roaster ovens offer a variety of conveniences including being an energy-efficient alternative to turning on a full-size oven. Roaster ovens also provide extra cooking space during the holidays and are easier to clean because the roaster pan is dishwasher safe. Additionally, the preparation of gravy is simplified with the roaster oven because the gravy may be easily simmered in the roaster oven pan. Roaster ovens may also be used for baking, cooking and serving. The roaster oven includes a secure-fitting lid that helps trap in heat and moisture. When the lid is removed, the roaster provides convenient access to stir or transfer food to an individual bowl or plate. Generally, the roaster oven also includes a removable rack to easily transport large roasts or turkeys to a serving platter.

Typical roasters include a wrap-around type heating element for applying heat to the sides of the cooking vessel or a bottom heating element arranged in functional relation to the bottom of the cooking well for supplying heat for cooking. Cooking wells are constructed of aluminum, stainless steel or enameled steel for reasons of durability and sanitation. However, both stainless steel and enameled steel have relatively low coefficients of heat conductivity as compared with other metals; and this presents a particular problem for cooking vessels of large capacity (i.e. up to 26 quarts). Applying heat only to the bottom or sides of such a large capacity cooking vessel, especially when constructed of stainless steel or enameled steel, may result in the upper portion of the cooking vessel being insufficiently heated. Thus, the food in the upper portion of the cooking vessel may be insufficiently cooked for serving purposes due to the loss of heat in combination with the low rate of heat conductivity and the slow rate at which heat is supplied to the upper portion of the cooking vessel. Often such a cooking vessel lack top-browning (i.e. to scorch lightly) capability, which is desirable when cooking chicken, turkey or other foodstuffs.

Traditional roasters are unable to effectively brown the top of large birds such as an illustrative turkey, which results in a "white spot" on the top of the large bird. To effectively remove the white spot, the illustrative turkey is removed from the roaster oven and put into a regular over for roasting. This two-step process creates additional work and clean-up and the extra step of cooking in a traditional oven causes the illustrative turkey to lose its moisture and tenderness. Basically, a properly browned turkey that is exposed to the two-step process of using a roasting oven and then a kitchen oven is dry and unappetizing.

In addition, it may be desirable after a roast is fully prepared, to prepare one or more additional food products (or "side" dishes), such as gravies, broths, sauces, dressings, casseroles, and the like. Gravy, for example, may be made from pan drippings collected during the roasting process. Conventionally, however, it may be necessary to transfer the pan drippings from the roasting oven to a saucepan for gravy preparation. This transfer process may be messy and time consuming and may add to the number of dishes which must be cleaned at the end of the food preparation process.

Thus, a roasting oven capable of easily and uniformly roasting and browning a top surface of a particular food product is desirable. A roasting oven within which a second or additional food product, such as a side dish, may be prepared is also desirable.

SUMMARY

An invertible roasting oven is described herein. The invertible roasting oven may include a double walled dome lid having an inner wall and an outer wall, a heating element that is disposed within the double walled dome lid between the inner wall and the outer wall, and a shallow pan that interfaces with the double walled dome lid. The shallow pan may be configured to function as a base to the double walled dome lid in a first mode of operation and as a cover to the double walled dome lid in a second mode of operation. More particularly, in the first mode of operation, the shallow pan may face up, such that a food product may be received in the shallow pan, and such that the dome lid may be placed overtop the shallow pan as a cover or lid for the shallow pan. In the second mode of operation, the roasting oven may be inverted, such that the shallow pan becomes the cover or lid for the dome lid, which in an inverted position, faces up to receive the food product. The invertible roasting oven may include a removable tray or rack configured to be placed in the shallow pan or the dome lid, depending upon the mode of operation, and configured to receive the food product. The invertible roasting oven may further include a cradle that receives the double walled dome lid when the cooking apparatus is operating in the second mode of operation.

The invertible roasting oven may further include a central handle coupled to an exterior surface of the double walled dome lid that extends axially away from the exterior surface of the double walled dome lid and a central handle coupled to an exterior surface of the shallow pan that extends axially away from the exterior surface of the shallow pan. The central handle coupled to the dome lid may permit removal of the dome lid from the shallow pan in the first mode of operation, and the central handle coupled to the shallow pan may permit removal of the shallow pan from the dome lid in the second mode of operation. The central handle extending axially away from the exterior surface of the dome lid may extend into the cradle when the cooking apparatus is operating in the second mode of operation. In various embodiments, the cradle may include a convex receiving structure and may include at least one vent (or, in various embodiments, the cradle may not include vents). Moreover, in various embodiments, the heating element may extend radially within the double walled dome lid and may be disposed substantially about a perimeter of the outer surface of the inner wall and separated from the inner surface of the outer wall by an insulating material.

In various embodiments, a cooking apparatus is disclosed. The cooking apparatus may include a double walled dome lid having an inner wall and an outer wall, a temperature controlling component, a heating element that is disposed within the double walled dome lid between the inner wall and the outer wall and that is electrically coupled to the temperature controlling component, a shallow pan that interfaces with the double walled dome lid at the lip of the double walled dome lid, a removable tray configured to sit within the shallow pan in a first mode of operation and to be removed from the shallow pan in a second mode of operation, and a cradle that receives the double walled dome lid when the cooking apparatus is operating in the second mode of operation. In various embodiments, the shallow pan may be configured to function as a base to the double walled dome lid in the first mode of operation and as a cover to the double walled dome lid in the second mode of operation. The inner wall may be joined to the outer wall at a lip of the double walled dome lid, and the temperature controlling component may be configured to receive a cooking input that causes the heating element to heat the double walled dome lid.

In various embodiments, the cooking apparatus may include a central handle coupled to an exterior surface of the double walled dome lid that extends axially away from the exterior surface of the double walled dome lid as well as a central handle coupled to an exterior surface of the shallow pan that extends axially away from the exterior surface of the shallow pan. The central handle coupled to the exterior surface of the dome lid may be configured to extend into the cradle when the cooking apparatus is operating in the second mode of operation, or the handle may be removable such that the handle may be installed on the base pan when the cooking apparatus is operated in the second mode of operation. The cradle may include a convex receiving structure and may include at least one vent (or, in various embodiments, the cradle may not include vents). The heating element may extend radially within the double walled dome lid and may be disposed substantially about a perimeter of the outer surface of the inner wall and may be separated from the inner surface of the outer wall by an insulating material.

In various embodiments, a method for cooking with a cooking apparatus is disclosed. The method may include receiving a first food product in a tray that sits within a shallow pan, covering the shallow pan with a double walled dome lid comprising an inner wall and an outer wall, heating the double walled dome lid with a heating element disposed between the inner wall and outer wall such that the first food product is cooked, removing the first food product from the shallow pan, inverting the double walled dome lid, placing the inverted double walled dome lid within a cradle, receiving a second food product within the inverted double walled dome lid, covering the inverted double walled dome lid with the shallow pan, and heating the inverted double walled dome lid with the heating element such that the second food product is cooked. In various embodiments, the double walled dome lid includes a handle that extends axially away from an exterior surface of the double walled dome lid and the shallow pan includes a handle that extends axially away from an exterior surface of the shallow pan. Condensate may collect in the dome lid during operation during the first mode of operation and in the shallow pan during the second mode of operation. Condensate may drain into the shallow pan in the first mode of operation and into the dome lid in the second mode of operation. The heating element may be separated from the inner surface of the outer wall by an insulating material.

FIGURES

The present invention will be more fully understood by reference to the following drawings which are presented for illustrative, not limiting, purposes.

DESCRIPTION

Figure 1:
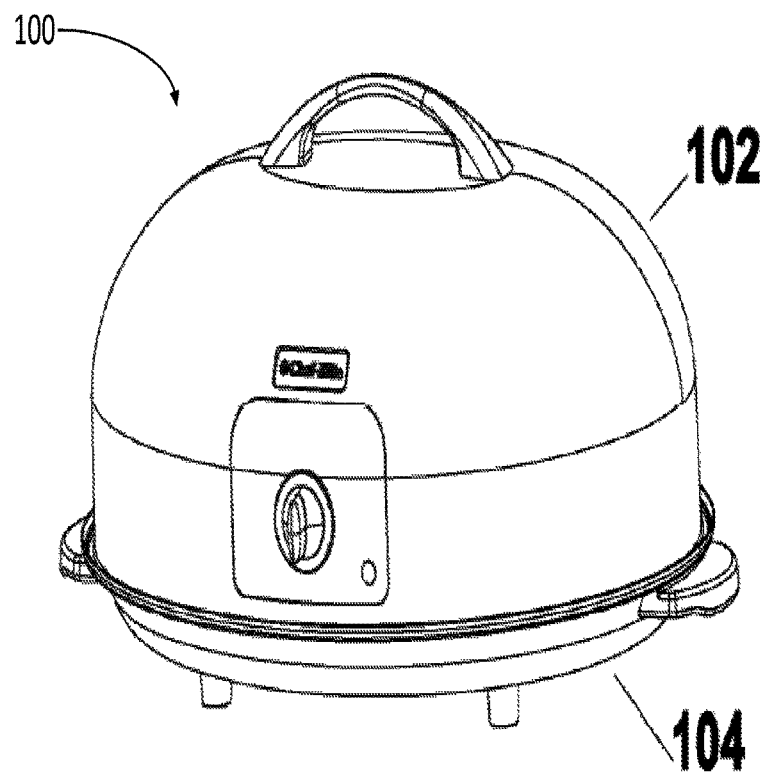
FIG. 1 shows a perspective view of a roasting oven as disclosed herein and in accordance with various embodiments.

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems and methods described herein may vary as to configuration and as to details. The following detailed description of the illustrative embodiments includes reference to the accompanying drawings, which form a part of this application. The drawings show, by way of illustration, specific embodiments in which the invention may be practiced. It is to be understood that other embodiments may be utilized and structural changes may be made without departing from the scope of the claims. It is further understood that the steps described with respect to the disclosed process(es) may be performed in any order and are not limited to the order presented herein.

In various embodiments, a roasting oven, as disclosed herein, may include a double walled dome lid, a shallow base pan configured to interface with the dome lid, a heating element radially disposed within the doubled walled dome lid, and a temperature controlling component. The heating element may be separated from the food product by an insulator, such as a fiber glass insulator.

The dome lid may further include a large and relatively heavy lid configured to retain heat energy. The heating element may be disposed within and about a perimeter of the dome lid and extend from a base of the dome lid to a particular height above the base of the dome lid. The heating element may thus include a "belt" that extends within the dome lid about a perimeter thereof. The heating element may not, therefore, be disposed about a top surface of the dome lid.

In the first mode of operation, the food product may be placed within the base pan and covered by the dome lid to enclose the food product between the base pan and dome lid. The space enclosed between the base pan and dome lid may be referred to herein as a "heating chamber," or simply a "chamber." A cooking input may be received at a temperature controlling component disposed within the dome lid, and the heating element may, in response to the cooking input, heat the chamber of the roasting oven based upon the selected cooking input.

The dome lid may retain and distribute heat over the surface of the food product, and in particular, over much of the food product, including the top surface (e.g., in the case of a turkey, over the turkey breast) of the food product. Moreover, because the heating element is disposed within the dome lid, the roasting oven disclosed herein may uniformly roast and/or brown the food product without exposing the food product to direct heat. The food product may not therefore scorch or burn. It is hypothesized that because the dome lid is relatively heavy, the roasting oven is able to develop and maintain an internal pressure that is greater than the air pressure outside of the roasting oven. The roasting oven may therefore operate, to some extent, as a pressure cooker. A food product disposed within the heating chamber may thus brown uniformly as well as retain its juiciness during cooking.

In various embodiments, and as described in greater detail below (e.g., with reference to FIGS. 15-27), a roasting oven may include an invertible roasting oven. An invertible roasting oven may be capable of cooking (i.e., roasting) a food product in a first configuration or mode of operation. An invertible roasting oven may further be capable of cooking a food product, such as a gravy, a broth, a sauce, a soup, a casserole, and the like in an inverted configuration or second mode of operation. Thus, an invertible roasting oven may include a multi-modal cooking apparatus, which may be configured in inverted and non-inverted modes.

With reference now to FIG. 1, a perspective view of a roasting oven 100 is shown. The roasting oven 100 may generally include a dome lid 102 and a tray or base pan 104. The dome lid 102 may interface with the base pan 104 at a base of the dome lid 102 to form a heating chamber. As described herein, a food product to be roasted and/or browned may be placed within the roasting oven 100. In addition, as described in greater detail below, the dome lid 102 may include a double walled dome lid. In various embodiments, the dome lid 102 and base pan 104 may include any metallic material such as sheet steel, aluminum, and/or chrome, any ceramic or partially ceramic material, any heat resistant glass, any heat resistant plastic, and/or any other suitable material.

The dome lid 102 may, as shown, rest on a relatively shallow base pan 104. Accordingly, the dome lid 102 may cover a majority of the food product within the heating chamber, while the base pan 104 may serve, in various embodiments, primarily to support the food product. Therefore, the dome lid 102 is large and somewhat heavy, particularly in comparison to the size and weight of the base pan 104. As such, and as described herein, the dome lid 102 is configured to store and radiate heat energy. Additionally, the heavy dome lid 102 may develop and maintain an internal air pressure within the heating chamber and, as a result, a high temperature within the heating chamber. In other words, the roasting oven 100 may function as a pressure cooker, because the dome lid 102 is sufficiently heavy to maintain an internal air pressure without disruption to form a seal between the dome lid 102 and base pan 104. A food product, such as a turkey, may therefore brown more uniformly over its outer surface (due to the high temperatures maintained within the heating chamber) as well as retain its juiciness and flavor (due to the air pressure developed within the heating chamber).

Figure 2:
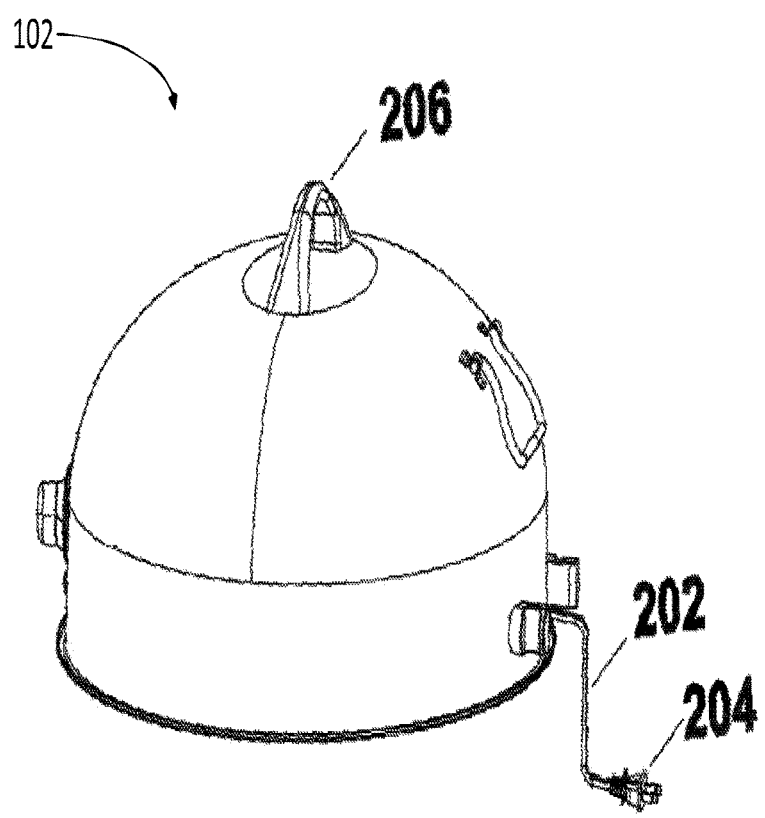
FIG. 2 shows a perspective view of an exterior portion of the dome lid of the roasting oven as disclosed herein and in accordance with various embodiments.

Referring to FIG. 2, a perspective view of an exterior portion of the dome lid 102 is shown. A power cable 202 may extend from the dome lid 102. The power cable 202 may terminate in a plug connector 204, which may be electrically coupled to a standard AC power outlet (e.g., a 120-volt power outlet in North America). The power cable 202 may supply power to the roasting oven 100. The power cable 202 may comprise a magnetic connector, which may be configured to couple to and decouple from the dome lid 102. For instance, the power cable 202 may be configured to couple to the dome lid 102 during operation to supply power to the roasting oven 100. The power cable 202 may be further configured to decouple from the dome lid 102 when the roasting oven 100 is not in operation or during operation to quickly and easily disconnect the roasting oven 100 from the power source (such as when the dome lid 102 is lifted away from the base pan 104). The dome lid 102 may further include a handle 206. A roasting oven operator may lift the dome lid 102 away from the base pan 104 using the handle 206 to expose the food product disposed within the roasting oven 100 (or to place a food product within the roasting oven 100).

Figure 3:
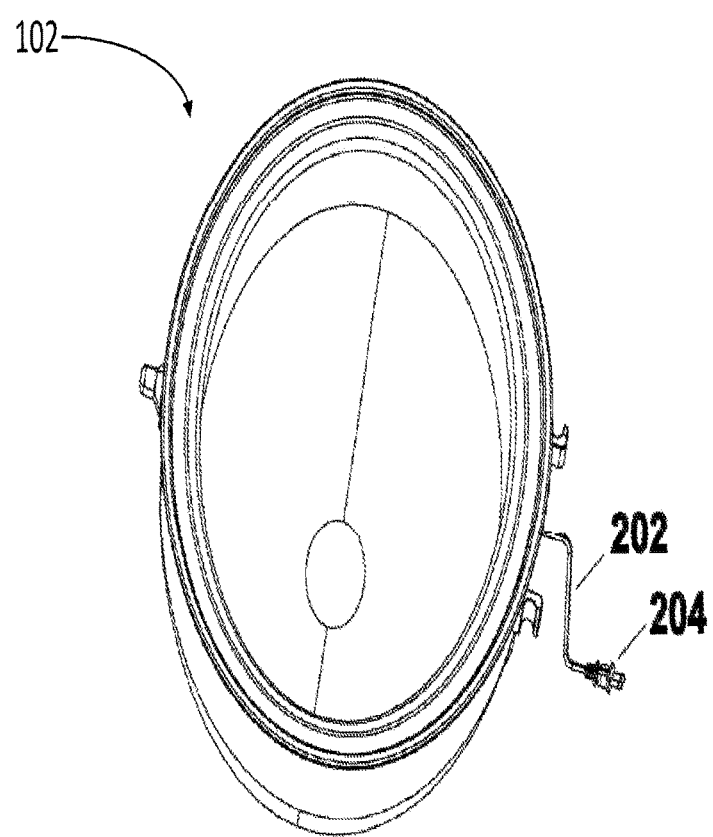
FIG. 3 shows a perspective view of an interior portion the dome lid of the roasting oven as disclosed herein and in accordance with various embodiments.

FIG. 3 shows a perspective view of an interior portion the dome lid 102. As shown, the interior portion of the dome lid 102 may rise sharply away from the base pan 104, such that the dome lid 102 defines, together with the base pan 104, the heating chamber (as described herein) within which a food product may be placed for roasting and surface browning. Thus, as described herein, the roasting oven 100 may include a very shallow base pan 104 configured to interface with a dome lid 102 that rises from the shallow base pan 104 over the food product to encompass much of the food product. In various embodiments, the base pan 104 may be less than 1.5 inches deep. The dome lid 102 may fit over such a shallow base pan 104 to ensure that the food product is adequately browned and cooked by the heating element (described herein) disposed within the dome lid 102.

However, in various embodiments, the base pan 104 may include a heating element for heating pan drippings or trimmings collected within the base pan 104 during roasting. A roasting oven 100 operator may, for example, activate (e.g., via a temperature controlling component of the base pan 104) a heating element disposed within the base pan 104 to bring pan drippings (or other food products) to a simmer within the base pan 104. An operator of the roasting oven 100 may therefore, for example, prepare a gravy within the base pan 104.

Figure 4:
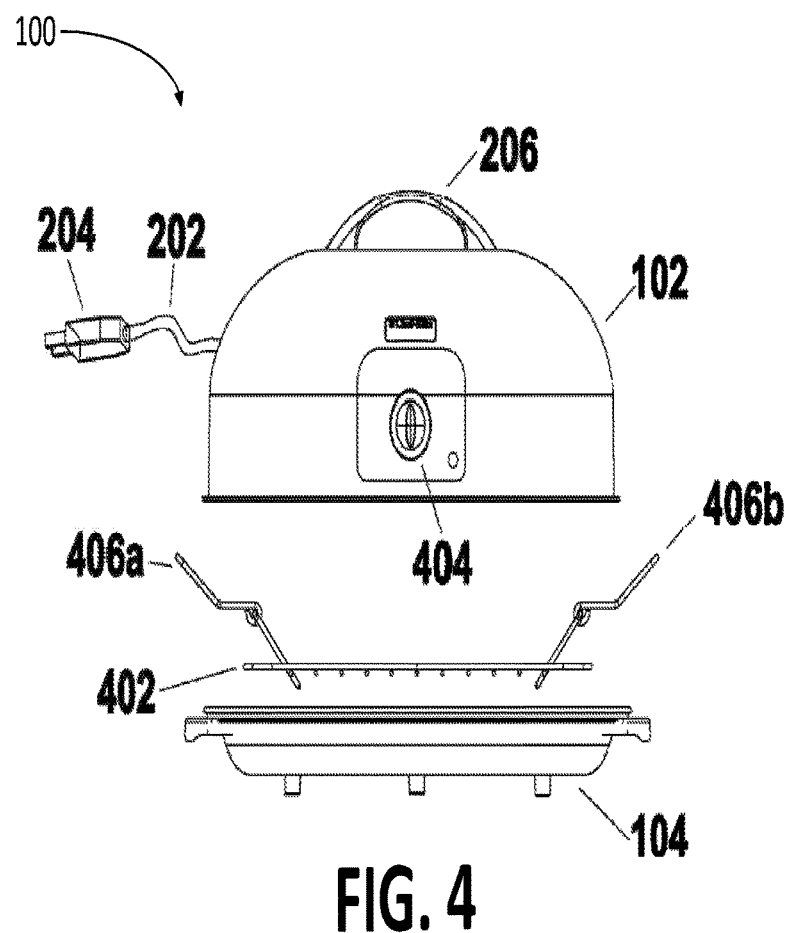
FIG. 4 shows a front view of the roasting oven, wherein a power cable is deployed through a wall outlet, as disclosed herein and in accordance with various embodiments.

With reference to FIG. 4, a front view of the roasting oven 100, in which the power cable 202 is deployed, is shown. As described herein, the power cable 202 may be coupled to the roasting oven 100 by way of the dome lid 102, such as by a direct connection through the dome lid 102 or through a magnetic connection to the surface of the dome lid 102. As shown, the roasting oven 100 may include a rack 402 and a temperature controlling knob 404. The rack 402 may be seated in the base pan 104, such that a food product placed on the rack 402 is elevated a slight distance above the bottom portion of the base pan 104. In various embodiments, the rack 402 may elevate the food product from between 0.5 inches above the bottom of the base pan 104 to 3.0 inches above the bottom of the base pan 104. The temperature controlling knob 404 may be variously disposed within or about the roasting oven 100, such as, for example, within the dome lid 102.

In various embodiments, the temperature controlling knob 404 may include any suitable temperature input and control device, such as, for example, a temperature, brownness, or doneness selector, a thermostat, and/or a thermocouple. A thermostat is an electromechanical component that senses the temperature within the heating chamber of the roasting oven, so that the internal temperature within the roasting oven 100 is maintained at or near a desired set point. The thermostat does this by turning the heating belt on or off. A thermocouple is an electrical device consisting of two different conductors forming electrical junctions at differing temperatures. A thermocouple produces a temperature-dependent voltage as a result of the thermoelectric effect, and this voltage may be interpreted to measure the internal temperature within the roasting oven 100.

Therefore, an operator of the roasting oven 100 may set the temperature controlling knob 404 to a desired temperature, a desired browning effect, a desired doneness (e.g., rare, medium rare, medium, well done, etc.), and the like. Having set the temperature controlling knob 404, the temperature of the roasting oven 100 may be regulated (e.g., via the thermostat or thermocouple) the temperature within the roasting oven 100, as described herein.

Moreover, in various embodiments, the rack 402 may include a plurality of lifting handles, such as lifting handles 406a and 406b. The lifting handles 406a and 406b may be grasped by a roasting oven 100 operator to lift or lower a food product placed on the rack 402 out of or into the base pan 104, respectively. Thus, a heavy food product, such as a turkey, may be safely and easily removed form or inserted into the base pan 104.

Figure 5:
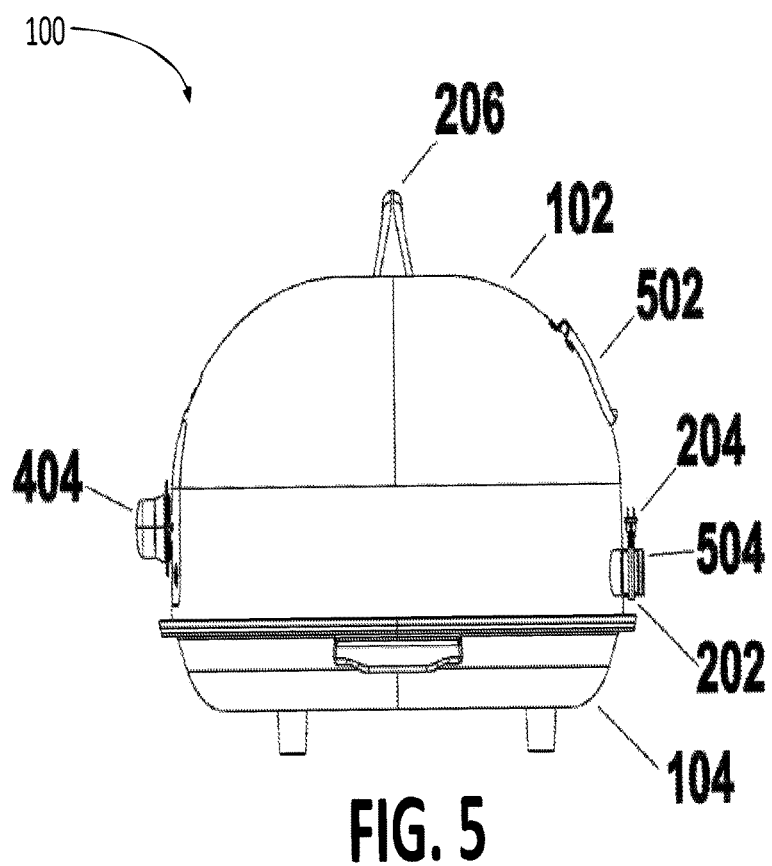
FIG. 5 shows a side view of the roasting oven as disclosed herein, wherein a power cable is magnetically connected to the dome lid, in accordance with various embodiments.

Referring to FIG. 5, a side view of the roasting oven 100 in which the power cable 202 is stowed about the dome lid 102 is shown. In the case of a magnetic connection, as described herein, the power cable 202 may be stored or stowed, with its magnetic connector, along a side surface of the roasting oven 100. For example, a magnetic power cable connector may magnetically couple to the side of the roasting oven 100, where, for example, the roasting oven 100 comprises a metallic material. Accordingly, in various embodiments, the power cable 202 may be stowed or wound about the dome lid 102 when the roasting oven 100 is not in use. Thus, the power cable 202 may be stowed such that the roasting oven 100 may be easily and compactly stored.

Figure 6:
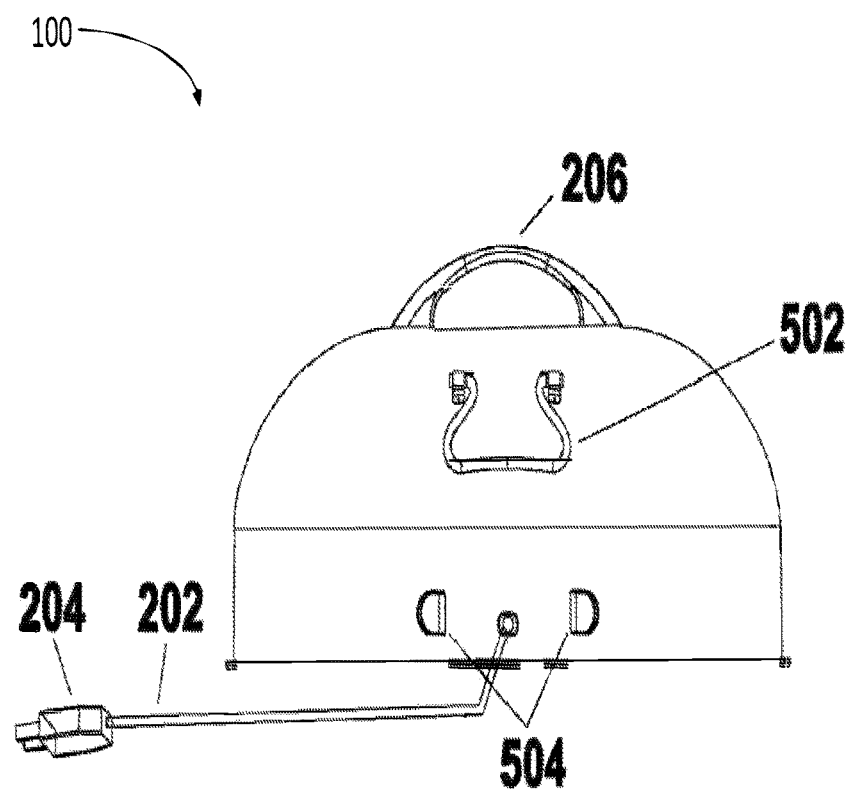
FIG. 6 shows a back view of the dome lid of the roasting oven as disclosed herein, wherein a fold-out support structure or "leg" is stowed, in accordance with various embodiments.

The dome lid 102 may include a fold-out support structure or leg 502 as well as a fixed support structure or leg 504. The fold-out leg 502 may be coupled to an exterior surface of the dome lid 102. A fixed support structure or leg 504 may be coupled to the exterior surface of the dome lid 102 as well. When the dome lid 102 is disposed over the base pan 104 (e.g., during a roasting operation), the fold out leg 502 may be folded substantially flat against the exterior surface of the dome lid 102, and the fixed leg 504 may extend, as shown, a short distance away from the exterior surface of the dome lid 102. When the dome lid 102 is removed from the base pan 104 (e.g., when a food product is being exposed within the base pan 104, removed from the base pan 104, or placed within the base pan 104), the fold out leg 502 may be manipulated by the roasting oven 100 operator such that the fold out leg 502 folds out to extend away from the dome lid 102. A side view of the dome lid 102 of the roasting oven 100 in which the fold-out leg is stowed or folded is shown at FIG. 6.

In various embodiments (and as described further below with respect to FIG. 9), the power cable 202 may be wound and stowed about the fixed leg 504. More particularly, the fixed leg 504 may include two members (see, e.g., FIG. 9, members 906a and 906b), about which the power cable 202 may be wound and stowed.

Figure 7:
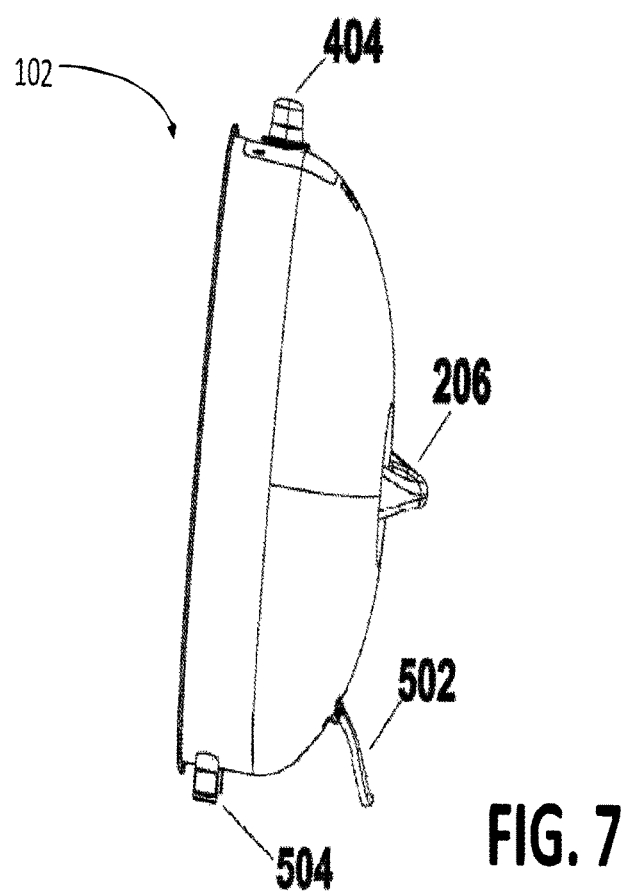
FIG. 7 shows a side view of the dome lid of the roasting oven resting in a vertical orientation as disclosed herein and in accordance with various embodiments.

As shown at FIG. 7, the dome lid 102 may be placed by the roasting oven 100 operator in a vertical or standing position. In a vertical position, the dome lid 102 may rest on the fold out leg 502 as well as the fixed leg 504. Moreover, in a vertical position, the dome lid 102, which may become very hot during operation, may be safely and conveniently set aside, so that the roasting oven 100 operator is not burned or otherwise inconvenienced by the dome lid 102. As described above, the dome lid 102 may be somewhat large and heavy. The fold out leg 502 and fixed leg 504 may therefore be sufficiently sturdy to support a large and heavy dome lid 102. Moreover, in various embodiments, and with reference to FIG. 28, the dome lid 102 may be removed from the base pan 104 and placed, in a horizontal orientation, one or more cooling racks 2802a-b. The cooling racks 2802a-b may comprise any rack suitable to support the dome lid 102. The cooling racks 2802a-b may therefore comprise any heat resistant material, such as a metallic material, a heat resistant plastic material, a ceramic material, a glass material, and the like. The cooling racks 2802a-b may support a heated dome lid 102 such that the dome lid 102 is not able to scorch or otherwise damage a counter surface. The dome lid 102 may not therefore include the fixed leg 502 and fold-out leg 504, where, for example, the dome lid 102 is configured to be placed on the cooling racks 2802a-b.

Figure 8:
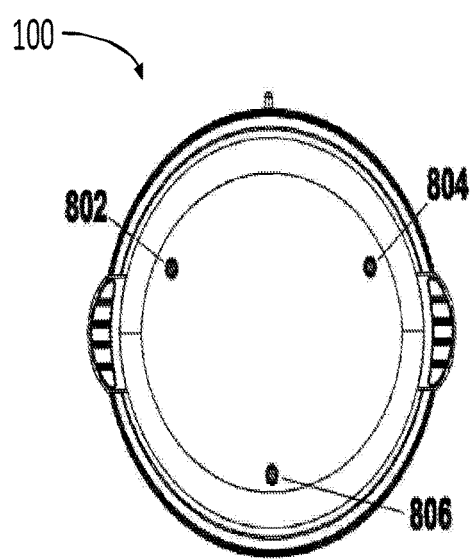
FIG. 8 shows a bottom view of the roasting oven as disclosed herein and in accordance with various embodiments.

Referring to FIG. 8, a bottom view of the roasting oven 100 is shown. In various embodiments, the roasting oven 100 may include a plurality of feet, e.g., feet 802, 804, and/or 806. The feet 802, 804, and/or 806 may raise the roasting oven 100 a small distance above a support surface (e.g., a kitchen counter), such that air is free to circulate under the roasting oven 100. The roasting oven 100 may therefore rest on a variety of support surfaces without the risk of burning or damaging those support surfaces.

Figure 9:
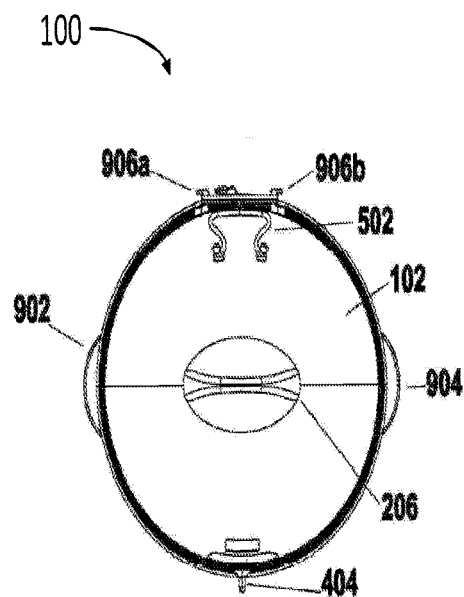
FIG. 9 shows a top view of the roasting oven, as disclosed herein and in accordance with various embodiments.

FIG. 9 shows a top view of the roasting oven 100. As described above, the roasting oven 100 may include the dome lid 102 and the handle 206. The roasting oven 100 may further include a plurality of side handles 902 and 904, which may be coupled to the base pan 104 or the dome lid 102 for lifting or moving all or a portion of the roasting oven 100. In addition, as shown with reference to FIGS. 5 and 9, the fixed leg 504 may include a two part or two-piece support structure, comprising two members, 906a and 906b, each member 906a and 906b separated by a distance along and external perimeter of the dome lid 102. Such a spacing may lend added stability to the dome lid 102 when it is situated in a vertical or standing position.

Figure 10:
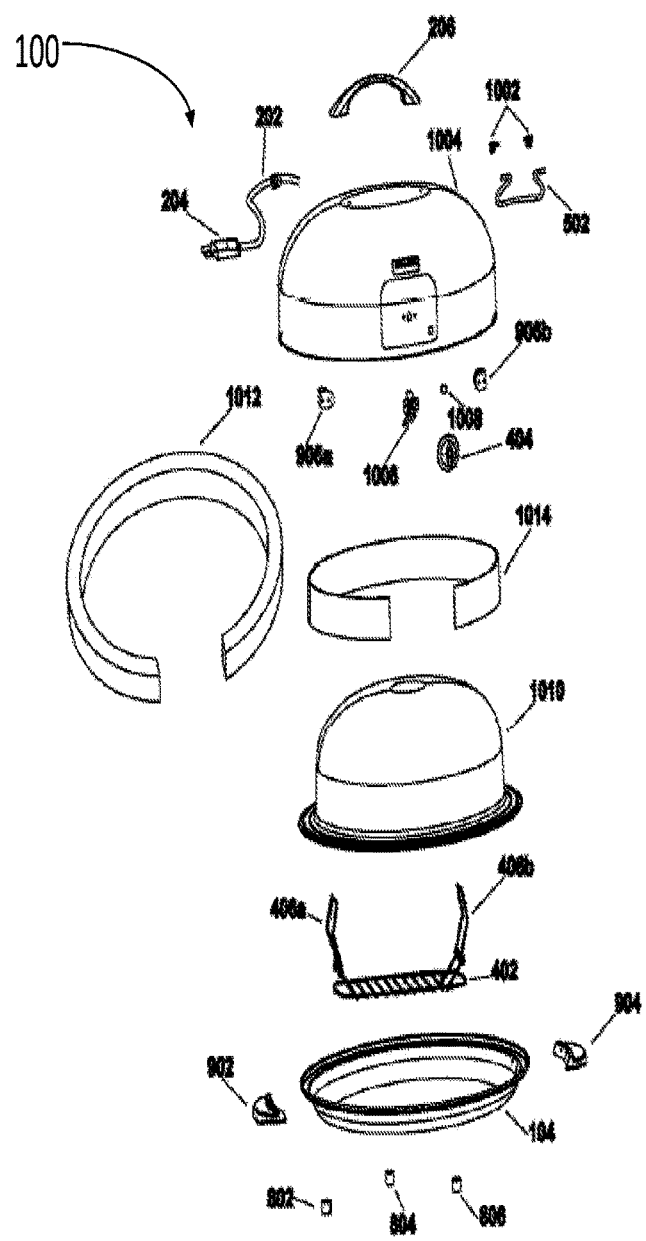
FIG. 10 shows an exploded view of the roasting oven as disclosed herein and in accordance with various embodiments.

FIG. 10 shows an exploded view of the roasting oven 100. From the top down, the roasting oven 100 may include the handle 206, the power cable 202 and plug connector 204, one or more mounting brackets 1002, the fold out leg 502, an outer wall lid (or "outer wall") 1004, the fixed leg 504 (comprising members 906a and 906b), a temperature controlling system 1009 comprising the temperature controlling knob 404 and a temperature controller 1006, an insulating material 1012, a heating element 1014, an inner wall lid (or "inner wall") 1010, the rack 402 (including the lifting handles 406a and 406b), the base pan 104, the side handles 902 and 904, and the feet 802, 804, and 806. As described herein, the temperature control system 1009 may include a thermostat or thermocouple. An operator of the roasting oven 100 may adjust the temperature (or other cooking setting, such as brownness or doneness) using the temperature controlling system 1009.

In addition, as shown, the heating element 1014 may generally extend within the dome lid 102 from a first edge of the dome lid 102 to a second edge of the dome lid 102, such that the heating element 1014 extends along an entire (or substantially an entire) perimeter of the dome lid 102. The heating element 1014 is therefore, in various embodiments, radially disposed about all or a portion of the dome lid 102. However, in various embodiments, the heating element 1014 may extend within any portion of the dome lid 102 that is less than the entire perimeter of the dome lid 102. Moreover, as shown, the heating element 1014 may extend within the dome lid 102 (i.e., between an exterior surface of the inner wall lid 1010 and an interior surface of the outer wall lid 1004) as a "belt" or "heating belt" that extends radially within the dome lid 102 and to a predetermined elevation or height above the base of the dome lid 102. In other words, the heating element 1014 may include a belt or strip disposed within the dome lid 102 between the inner wall lid 1010 and the outer wall lid 1004. The heating element 1014 may further extend from a base of the dome lid 102 to a predetermined height above the base of the dome lid 102, such that the heating element is not disposed in a top portion of the dome lid 102.

As a result of the location of the heating element 1014 within the dome lid 102, the roasting oven 100 may apply indirect heat to the food product (including a top surface of the food product), so that the food product is uniformly browned, but not scorched by the heating element 1014. Because the heating element 1014 is wrapped around the inner wall of the dome lid 102, the heat energy generated by the heating element 1014 is predominantly transferred to the inside of the inner wall of the domed lid 102. Furthermore, the insulator is positioned on the outside of the heating element 1014 and serves a barrier to prevent heat from being transmitted to the outer wall of the domed lid 102. The outer surface of the domed lid 102 is thereby kept relatively cooler than the inner surface of the domed lid 102. Therefore, as the heat generated by the heating element 1014 is contained and circulated within the dome lid 102, the heat may radiate more uniformly and with less intensity toward the food product, resulting in a uniformly browned, but not scorched, food product.

The heating element 1014 may include any suitable heating element, such as, for example, an electric heating element. An electric heating element may include a metallic structure having a resistance to electric current that generates heat energy when the electric current is passed through the electric heating element. The electric current may be supplied by the power cable 202, which may draw electric current from an electrical wall outlet as described above.

Moreover, although the heating element 1014 may be situated radially as a "belt" within the dome lid 102, the dome lid 102 may store substantial heat energy. Thus, as heat rises away from the heating element 1014, much of the heat may be trapped internally within the structure of the dome lid 102 itself. As a result, the dome lid 102 may radiate stored heat energy by way of a convective (air circulating) process towards the top and over outer surfaces of the enclosed food product. The food product may therefore brown uniformly within the roasting oven 100, notwithstanding the absence of a heating element directly overtop the food product.

Figure 11:
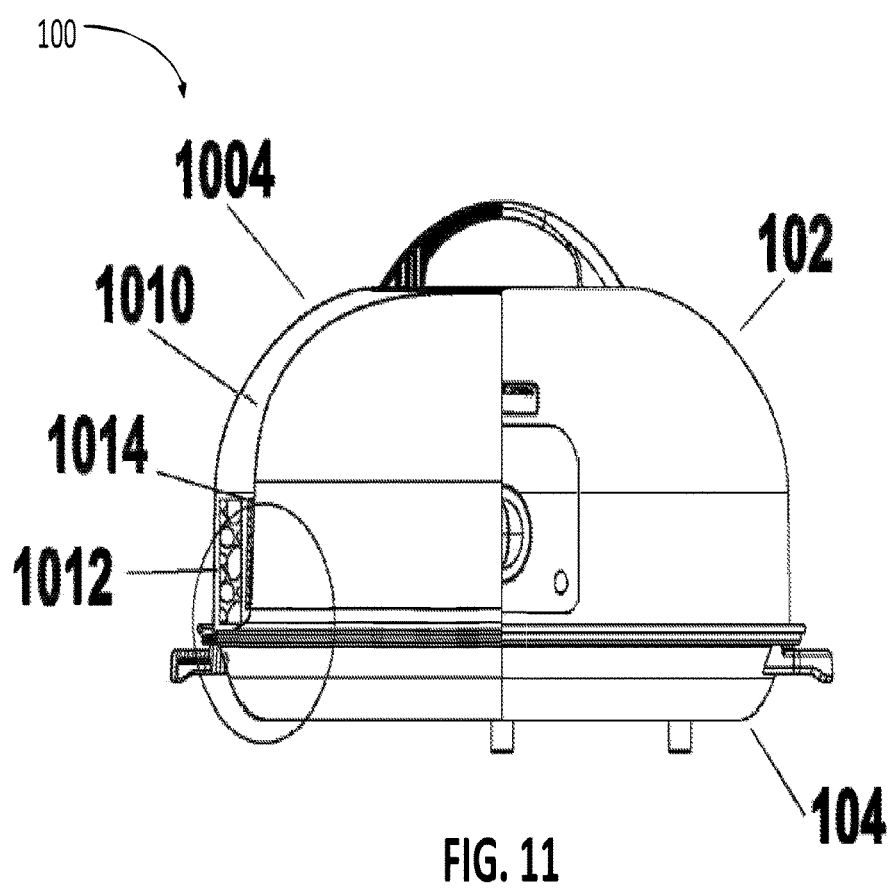
FIG. 11 shows a partial cross-section of an embodiment of the roasting oven, wherein an insulating material is disposed between the outer wall lid and the heating element, as disclosed herein and in accordance with various embodiments.

FIG. 11 shows a partial cross-section of the roasting oven 100, in which the insulating material 1012 is disposed within the dome lid 102. More particularly, as shown, the portion of the heating element 1014 that faces the outer wall lid 1004 may be separated from the outer wall lid 1004 by the insulating material 1012, while the portion of the heating element 1014 that faces the inner wall lid 1010 may do so without an intervening layer of insulating material. Thus, some of the heat generated by the heating element 1014 may be conducted through the inner wall lid 1010. This may help to dissipate some of the heat generated by the heating element 1014 into the heating chamber of the roasting oven 100.

The heating element 1014 may also include a heating belt. By way of example and not of limitation, the roasting oven 100 may include the insulating material 1012, which may be radially disposed about the heating element 1014 and positioned within the outer wall lid 1004, such that a top or upper portion of the dome lid 102 does not include the insulating material 1012. Moreover, as described herein, the heating element 1014 as well as the insulating material 1012 may extend substantially radially within the dome lid 102. In other words, the heating element 1014 and insulating material 1012 may extend about a perimeter (or substantially about a perimeter) of the dome lid 102 and within the dome lid 102 between the inner wall lid 1010 and the outer wall lid 1004. The heating element 1014 and/or insulating material 1012 may further extend from a base of the dome lid 102 to a predetermined height above the base of the dome lid 102.

In another illustrative heating belt embodiment, the insulating material 1012 may extend from the base to the top of the dome lid 102. Thus, the insulating material 1012 is disposed between the inner wall lid 1010 and the outer wall lid 1004. Also, the heating element 1014 is separated from contact with the outer wall lid 1004 by the insulating material 1012.

Figure 12:
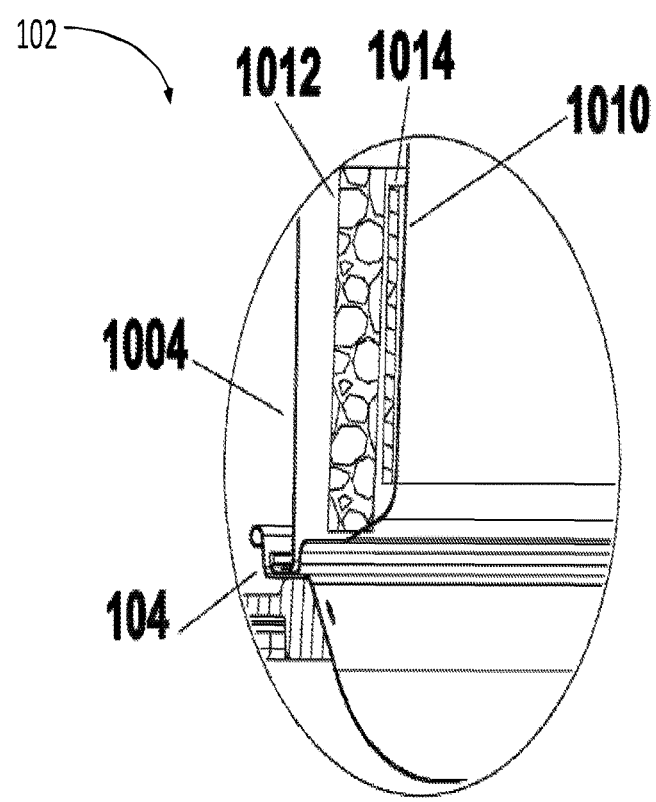
FIG. 12 shows a cutout view of the inner wall and outer wall of the dome lid as disclosed herein and in accordance with various embodiments.

FIG. 12 shows a cutout view of the inner wall lid 1010 and outer wall lid 1004 of the dome lid 102. As shown, the inner wall lid 1010 may be joined to the outer wall lid 1004 at a base of the double walled dome lid 102 to form a chamber within which the heating element 1014 may be disposed. The insulating material 1012 may be disposed within the chamber formed between the outer wall lid 1004 and the inner wall lid 1010. The inner wall lid 1010 may be joined to the outer wall lid 1004 with a tab to seal the inner wall lid 1010 to the outer wall lid 1004. Additionally, the inner wall lid 1010 may be joined to the outer wall lid 1004 by welding, by pressure, by one or more rivets or bolts, by a heat bonding technique, by way of a heat-resistant adhesive, and the like.

Figure 13:
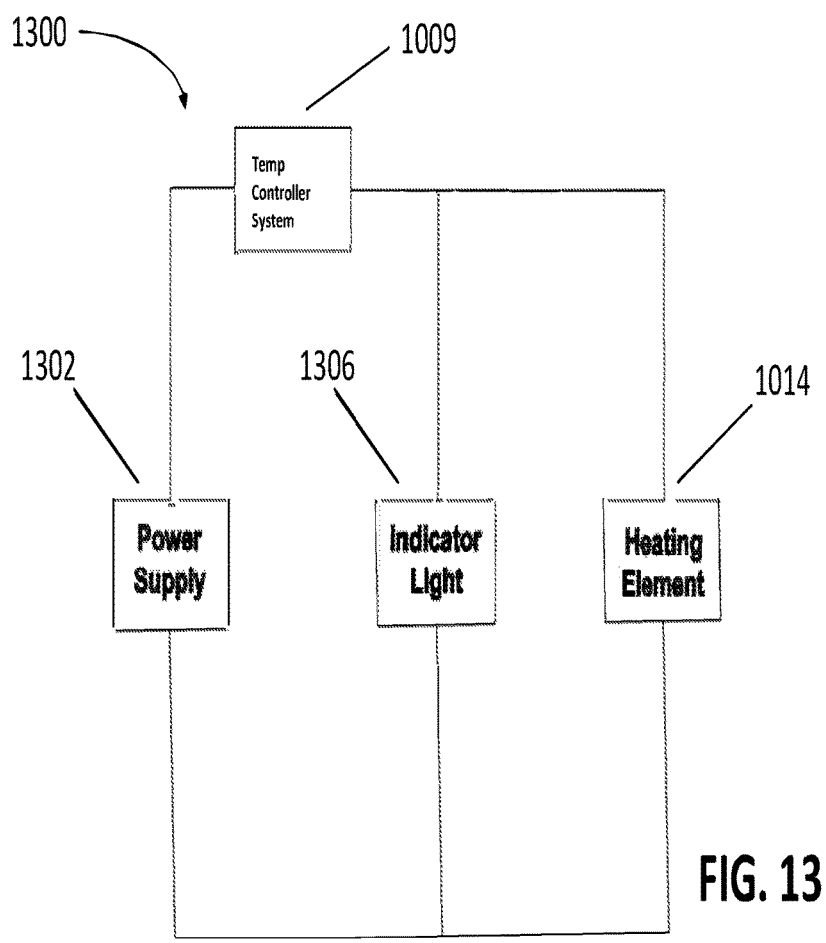
FIG. 13 shows an electrical circuit diagram of the roasting oven as disclosed herein and in accordance with various embodiments.

With reference to FIG. 13, an electrical circuit diagram 1300 of the roasting oven 100 is shown. In various embodiments, the roasting oven 100 may include a power supply 1302, the temperature controlling system 1009, an indicator light 1306, and/or the heating element 1014. The power supply 1302 may be coupled, as described herein, to a wall outlet by way of the power cable 202. The power supply 1302 may supply power to the temperature controlling system, the indicator light 1306, and the heating element 1014. In various embodiments, and during operation, an operator of the roasting oven 100 may adjust the temperature controlling system 1009 (e.g., by way of the knob 404) to adjust the operating temperature of the roasting oven 100. The indicator light 1306 may be illuminated in response to a cooking input, during operation, during a preheating stage, and the like.

The temperature controlling system 1009 may, as described above, comprise the knob 404 and the temperature controller 1006. The temperature controlling system 1009 may control the power input to the heating belt 1014, such that the heating belt 1014 is turned on or turned off. The heating belt 1014 can be turned on or turned off based upon the cooking input to achieve a desired temperature within the roasting oven 100. The heating element 1014 may therefore supply heat to the roasting oven 100 based upon the cooking input and in response to a temperature detected or measured by a thermostat or thermocouple of the temperature controlling system 1009. More particularly, the temperature controlling system 1009 may include, in various embodiments a thermostat or potentiometer, which may be adjusted in response to a cooking input corresponding to a position of the knob 404. As the cooking input is increased or decreased, the power supplied to the heating element 1014 may be adjusted by the temperature controlling system 1009, so that the heating element 1014 generates more or less heat. The power supplied to the heating element 1014 may further be adjusted (e.g., increased or decreased) based upon a temperature measurement.

By way of example and not of limitation, the temperature controlling system 1009 may include a bimetal strip that is proximate to the inner shell, which senses and controls the temperature inside the dome. The temperature maybe set by turning the shaft of knob to a desired temperature. At the desired temperature, contact points are opened and closed for an illustrative heating belt, which causes the illustrative heating belt to be turned on and/or off; thereby, maintaining the desired temperature.

Figure 14:
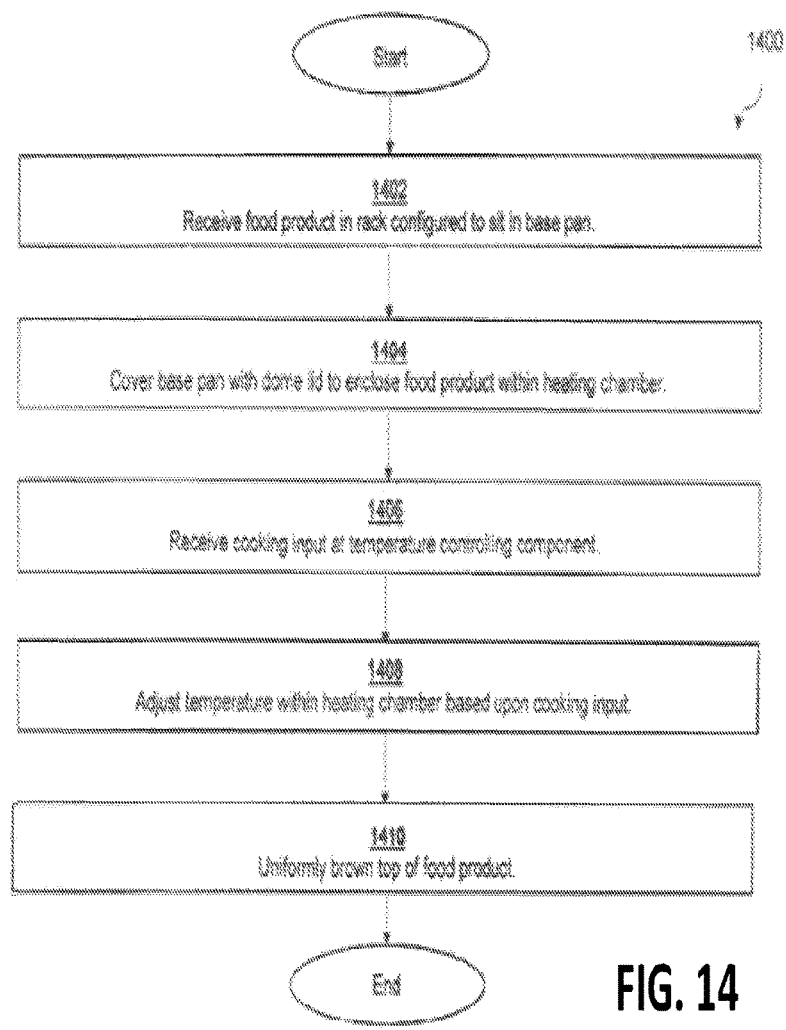
FIG. 14 shows a process for cooking a food product with a roasting oven as disclosed herein and in accordance with various embodiments.

Referring now to FIG. 14, a process 1400 for cooking a food product with a roasting oven 100 is shown. In various embodiments, the process 1400 may include receiving a food product in a tray or rack 402 that is configured to sit in the (shallow) base pan 104 (step 1402). The base pan 104 may be covered by the dome lid 102, and the food product may be enclosed within the heating chamber defined between the base pan 104 and the dome lid 102 (step 1404). A cooking input (e.g., a cooking temperature, a desired doneness, a degree of browning, etc.) may be input and received by the temperature controlling system 1009 (step 1406). The temperature controlling system may include the heating element 1014, and the temperature controlling system 1009 may adjust the heat output by the heating element 1014 based upon the cooking input (step 1408). Thus, the roasting oven 100 may cook and/or brown a food product to a desired or selected temperature, doneness, degree of browning, etc. As described herein, the food product (e.g., the top of the food product) may further be uniformly browned by the roasting oven 100 (step 1410).

The roasting oven 100 disclosed herein may therefore cook as well as uniformly brown a food product. More particularly, the outer surfaces (including a top surface, such as a turkey breast) of a food product may be uniformly browned by the roasting oven 100, because the heating element 1014 of the roaster oven 100 is disposed within the dome lid 102, such that heat radiates away from the lid and down over the food product. The heating element 1014 is further enclosed within the dome lid 102, so that heat is not directly applied to the food product, but indirectly, as it circulates within the dome lid 102. Moreover, because the dome lid 102 is large and extends over and around a large portion of the food product, the roasting oven 100 is capable of both browning a top surface (and side or other surfaces) of the food product as well as cooking the food product to a desired temperature or doneness.

As described above, it may be desirable (e.g., after a food product is fully roasted) to prepare a different type of food product, such as a gravy, a broth, a sauce, a soup, a casserole, and the like. Such additional food products may conventionally be prepared in one or more additional dishes. For example, conventional methods of gravy preparation may require the transfer of pan drippings from the roasting oven to a saucepan, which may complicate food preparation as well as add to the number of dishes which must be cleaned after food preparation is complete.

The roasting oven 100 may be configured, in various embodiments, to serve as a cooking vessel for the preparation of other food products, such as, for example, gravies, broths, sauces and soups, various stuffings and dressings, various casseroles, and the like.

Figure 15:
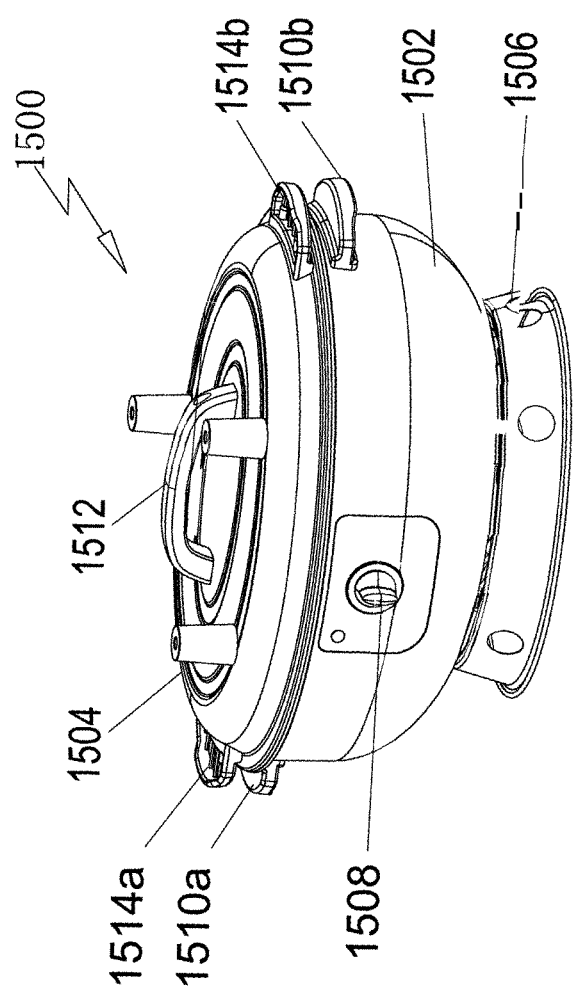
FIG. 15 shows a perspective view of an invertible roasting oven in an inverted position as disclosed herein and in accordance with various embodiments.

To this end, and with reference to FIG. 15, a perspective view of an invertible roasting oven 1500 is shown. The invertible roasting oven (or "IRO") 1500 may include the roasting oven 100, as described above, with certain changes and additions. For instance, the IRO 1500 may include the roasting oven 100 configured for inversion. In an inverted position, the dome lid 1502 of the IRO 1500 may function as a vessel or food product receptacle and may receive one or more food products for the preparation of a particular food product, such as a side dish like a gravy, a broth, a soup, a casserole, and the like.

The IRO 1500 may therefore include a dome lid 1502 and a shallow base pan 1504. The IRO 1500 may further include a cradle 1506. In various embodiments, and by way of example and not of limitation, the dome lid 1502, base pan 1504 or cradle 1506 may include any metallic material such as sheet steel, aluminum, and/or chrome, any ceramic or partially ceramic material, any heat resistant glass, any heat resistant plastic, and/or any other suitable material. The dome lid 1502 and shallow base pan 1504 may be identical to or substantially similar to the dome lid 102 and base pan 104, respectively, with the illustrative changes or alterations described herein.

The dome lid 1502 may include a temperature controlling system, which may control an internal temperature of the IRO 1502 during operation. As described below, the temperature controlling system may comprise a control knob 1508 and a temperature controller mounted on the outside surface of the inner wall lid of the dome lid 1502. The control knob 1508 may be coupled to the temperature controller by a turning stem that projects through the outer wall lid of the dome lid 1502, such that a cooking input may be provided to the temperature controller by way of the control knob 1508. The temperature controller may include any suitable temperature controlling component, such as a thermostat or a thermocouple as described above. The dome lid 1502 may further include a pair of side handles 1510a and 1510b, which may be used to lift and move the IRO 1502.

Figure 17:
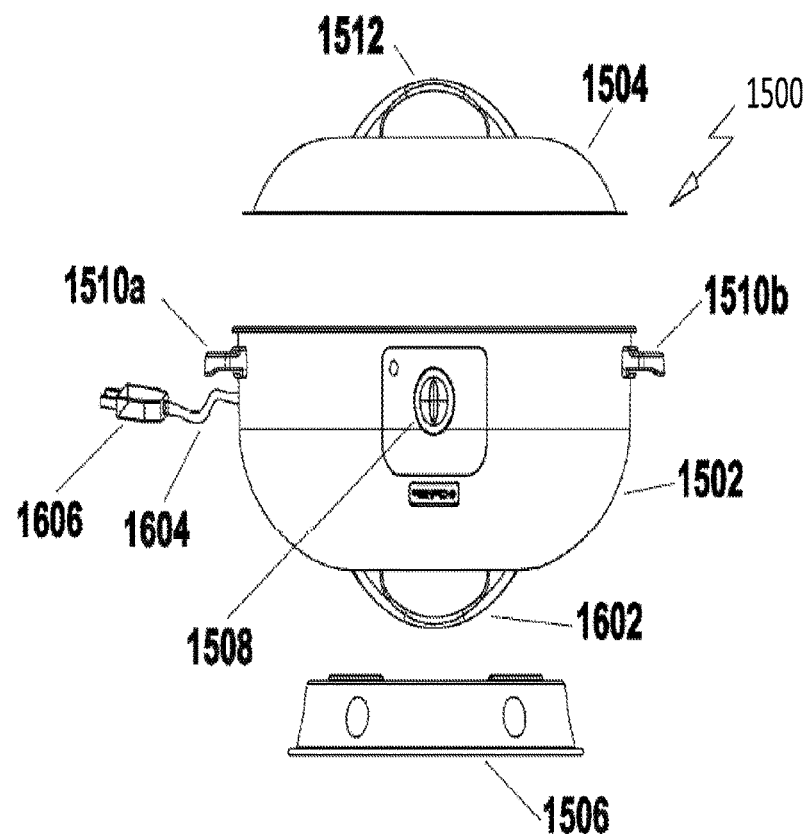
FIG. 17 shows a front view of an invertible roasting oven having a single set of side handles and in an inverted position as disclosed herein and in accordance with various embodiments.

The base pan 1504 may include a central handle 1512. The central handle 1512 may extend axially away from the base pan 1504. The base pan 1504 may further include a pair of side handles 1514a and 1514b. However, in various embodiments, and as shown at FIG. 17, the base pan 1504 may exclude the side handles 1514a and 1514b (depicted at FIG. 15).

Figure 16:
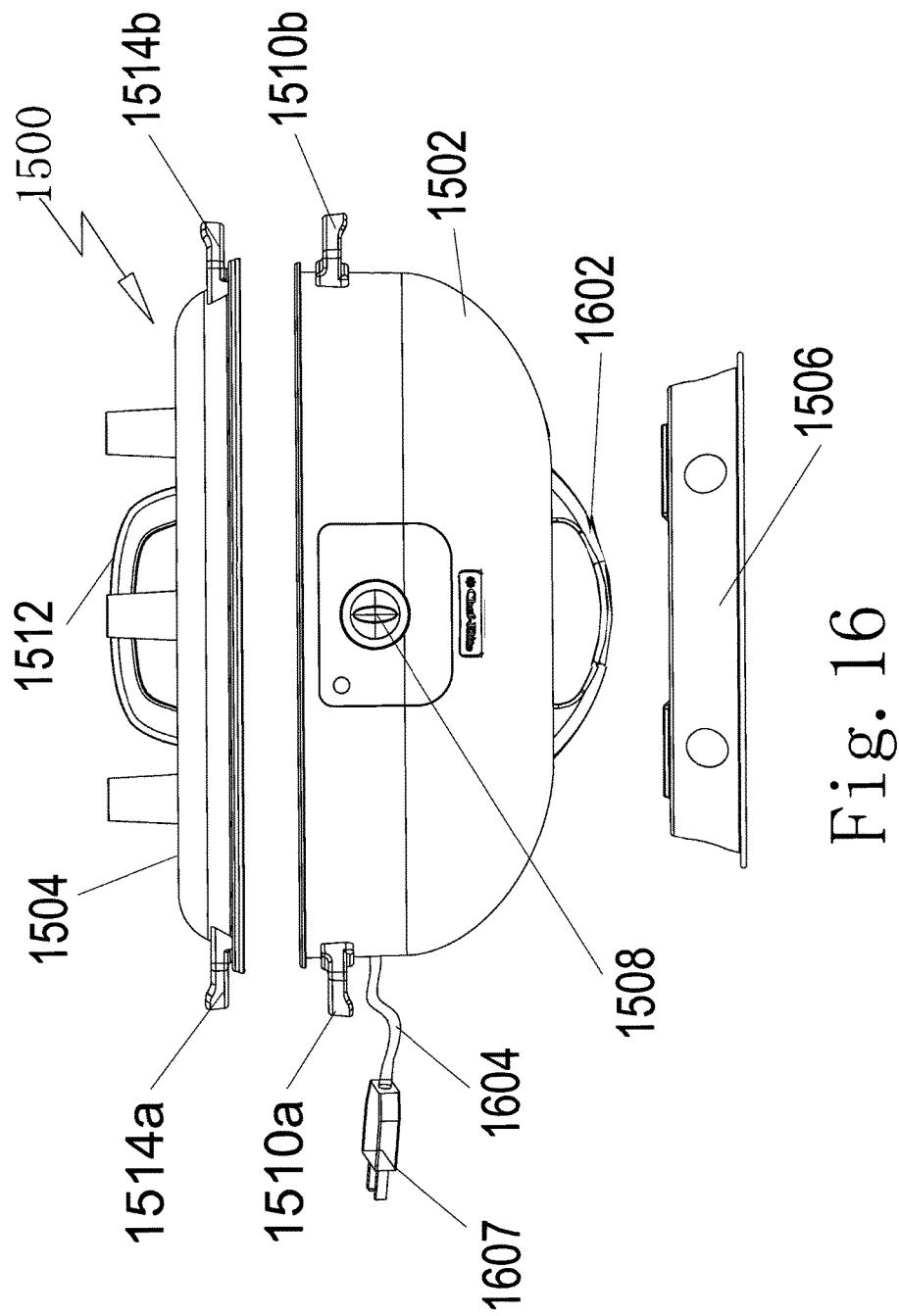
FIG. 16 shows a front view of an invertible roasting oven in an inverted position as disclosed herein and in accordance with various embodiments.

Referring to FIG. 16, the dome lid 1502 may further include a central handle 1602. Moreover, as described above with respect to the roasting oven 100, the IRO 1502 may include a power cable 1604 that terminates in a plug connector 1606, which may be electrically coupled to a standard AC power outlet (e.g., a 120-volt power outlet in North America). The power cable 1604 may be coupled to the dome lid 1502 through direct wiring and through the domed lid 1502 or through magnetic coupling where the coupled end and power cable 1604 and plug connector 1606 can be decoupled at the surface of the domed lid 1502. The power cable 1604 may thus supply power to the IRO 1500.

In various embodiments, the cradle 1506 may include a convex receiving surface configured to receive the dome lid 1502. In other words, the cradle 1506 may include a substantially dish shaped or crater shaped structure. The cradle 1506 may also include a substantially elliptical base portion coupled through an ascending sidewall to a substantially elliptical receiving portion. The length or diameter of the semi-major axis of the receiving portion may be less than the length or diameter of the semi-major axis of the base portion. Thus, the cradle 1506 may, in various embodiments, taper from the base portion to the receiving portion to form a truncated cone shaped structure. The cradle 1506 may further include a plurality of vents or apertures. For instance, one or more vents may be formed in the sidewall to dissipate heat energy originating with the dome lid 1502.

The cradle 1506 may therefore receive the dome lid 1502 when the dome lid 1502 is inverted, such that the dome lid 1502 is securely disposed within the cradle 1506 and capable of receiving one or more food products. More particularly, the dome lid 1502, which may, as shown, include a sloping outer surface, may fit within the sloping/convex receiving surface of the cradle 1506. The cradle 1506 may further receive the central handle 1602 of the dome lid 1502 within an interior portion of the cradle 1506. For example, the cradle 1506 may be of a depth or dimension sufficient to receive the central handle 1602 in a manner that does not permit the central handle to make contact with the base portion of the cradle 1506 or a surface over which the cradle 1506 is disposed (e.g., a countertop). In other words, the cradle 1506 may support the dome lid 1502 and raise the dome lid 1502 a distance sufficient to prevent the central handle 1602 from making contact with a countertop or other surface over which the dome lid 1502 is disposed.

Figure 18:
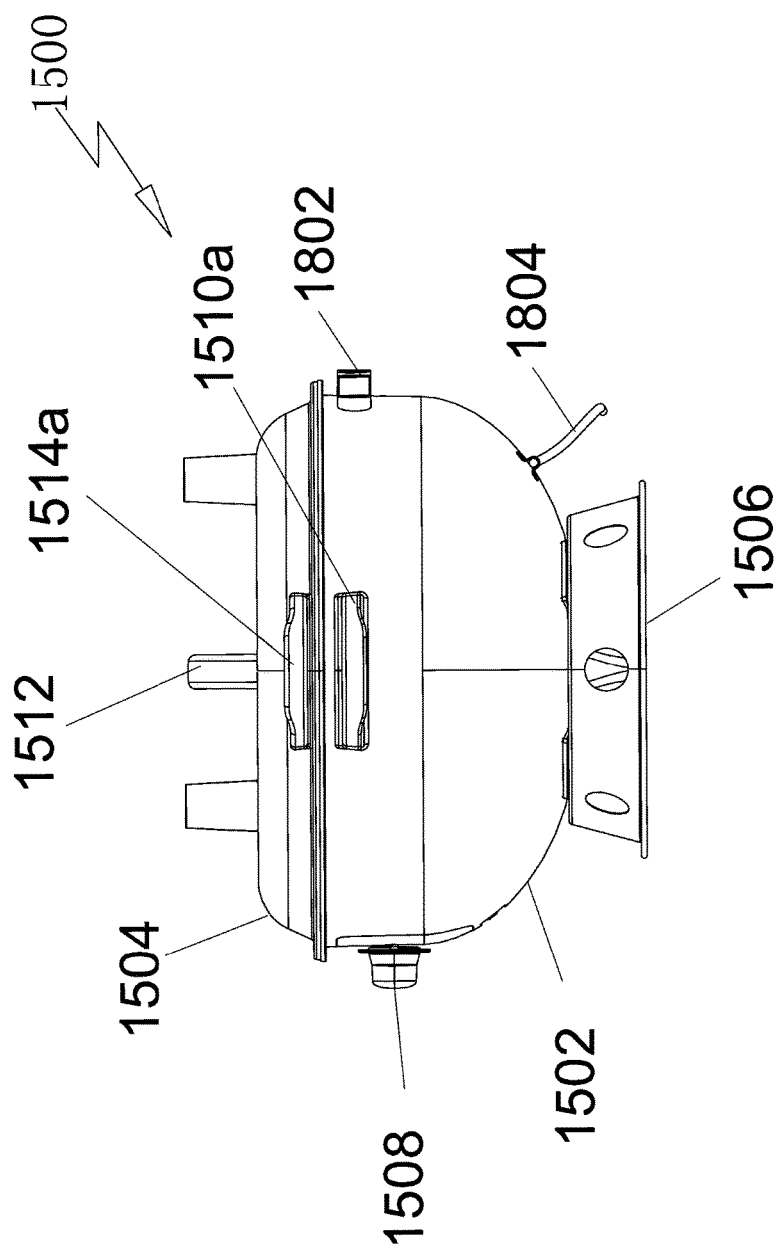
FIG. 18 shows a side view of an invertible roasting oven in an inverted position and having a fold-out support structure is deployed, as disclosed herein and in accordance with various embodiments.
Figure 21:
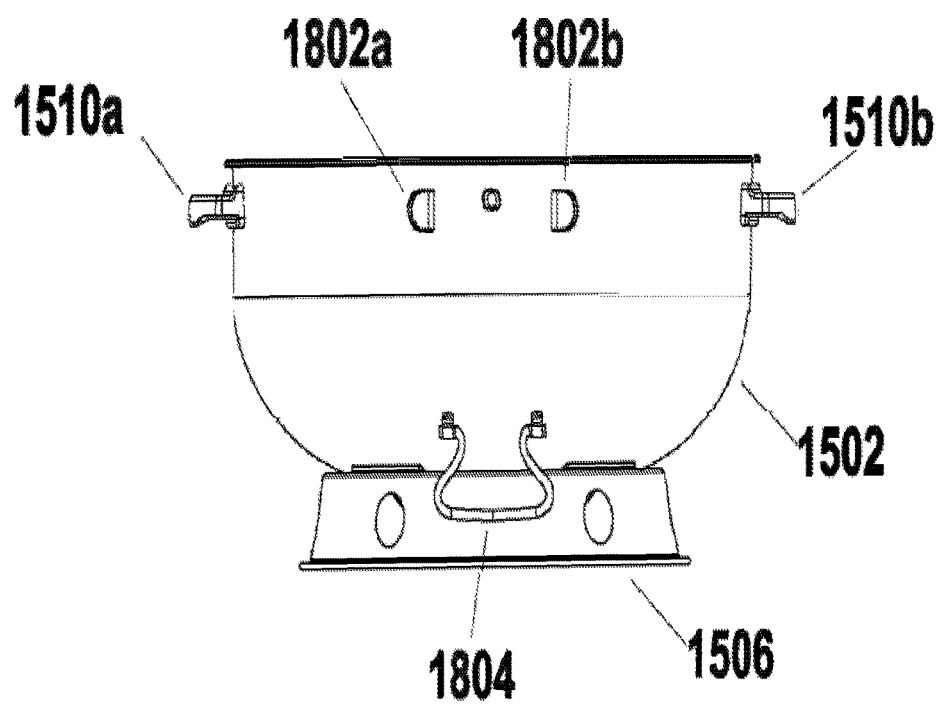
FIG. 21 shows a front view of a dome lid of an invertible roasting oven in an inverted position as disclosed herein and in accordance with various embodiments.

With reference to FIG. 18, the IRO 1500 may include, as described above with respect to the roasting oven 100, a fixed support structure or leg 1802 and/or a fold-out support structure or leg 1804. The fixed leg 1802 may (as shown at FIG. 21) include a first leg member or element 1802a and a second leg member or element 1802b, which may be separated along an exterior surface of the dome lid 1502 by a particular distance. The fold-out leg 1804 may be coupled to the dome lid 1502 and may extend away from the dome lid 1502. In various embodiments, the fold-out leg 1804 may be stowed such that it is substantially flush against the outer surface of the dome lid 1502 and deployed such that it extends away from the dome lid 1502. The fixed leg 1802 and/or fold-out leg 1804 may support the dome lid 1502, as described above, when the dome lid 1502 is removed (in a second mode of operation) from the cradle 1506 and set aside in a vertical position (see, e.g., FIG. 7). Thus, the fixed leg 1802 and fold-out leg 1804 may support the relatively heavy dome lid 1502 in an upright or vertical resting position when the dome lid 1502 is decoupled or removed from the cradle 1506.

In various embodiments, the fold-out leg 1804 may be deployed when the dome lid 1502 is engaged with or covered by the base pan 1504—i.e., when the IRO 1500 is in an inverted position or mode of operation.

Figure 28:
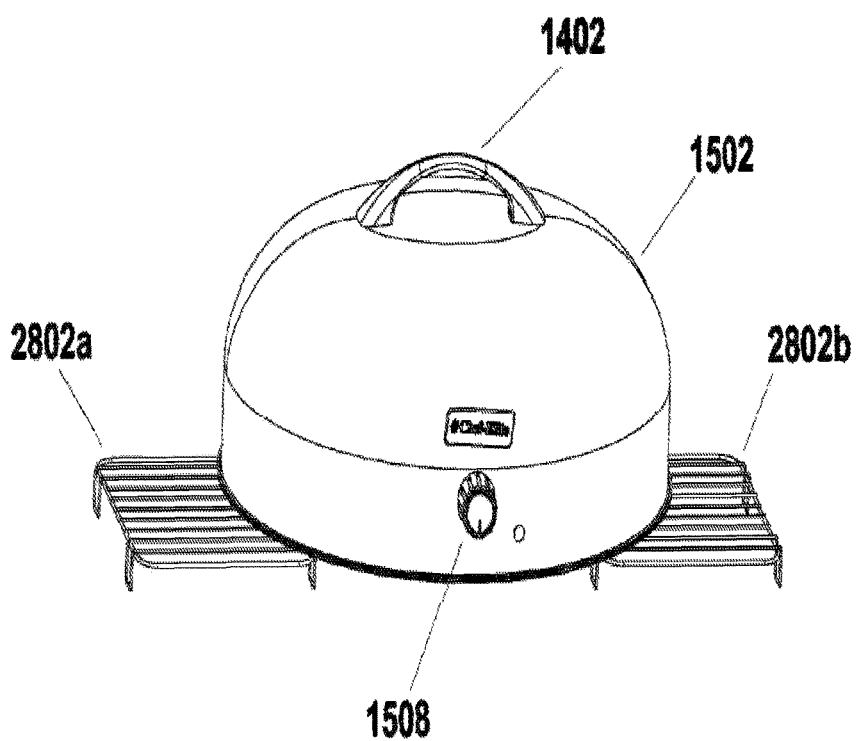
FIG. 28 shows a plurality of cooling racks configured to receive a dome lid or base pan.

In another embodiment, and as shown at FIG. 28, in a first mode of operation, the (hot) dome lid 1502 may be removed from the base pan 1504 and placed, in a horizontal orientation, one or more cooling racks 2802a-b. This may be desirable to permit the dome lid 1502 to cool when the dome lid 1502 is removed from the base pan 1504. The cooling racks 2802*a-b* may comprise any rack suitable to support the dome lid 1502. The cooling racks 2802*a-b* may therefore comprise any heat resistant material, such as a metallic material, a heat resistant plastic material, a ceramic material, a glass material, and the like. The cooling racks 2802*a-b* may support a heated dome lid 1502 such that the dome lid 1502 is not able to scorch or otherwise damage a counter surface. The dome lid 1502 may not therefore include the fixed leg 1802 and fold-out leg 1804, where, for example, the dome lid 1502 is configured to be placed on the cooling racks 2802*a-b*. Further, in various embodiments, base pan 1504 may be configured to be placed on the cooling racks 2802*a-b* for cooling, such as, for example, where the IRO 1500 is operating in the second mode of operation.

Moreover, in a second mode of operation, the cradle 1506 may serve as a support structure to allow the dome lid 1502 to cool off before carrying out further operations, such as washing and cleaning the dome lid 1502. Further, in the second mode of operation, the (hot) base pan 1504 may be placed on the cooling racks 2802*a-b* while it is hot to permit the base pan 1504 to cool prior to further operations, such as washing and cleaning the base pan 1504.

Figure 19:
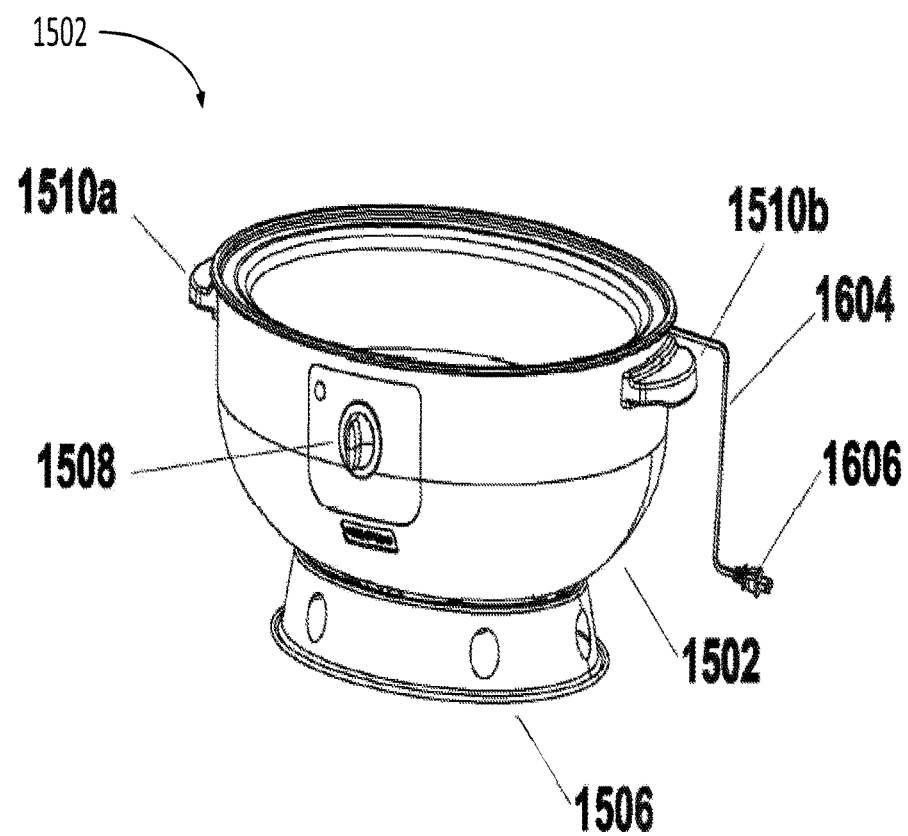
FIG. 19 shows a perspective view of a dome lid of an invertible roasting oven in an inverted position as disclosed herein and in accordance with various embodiments.
Figure 20:
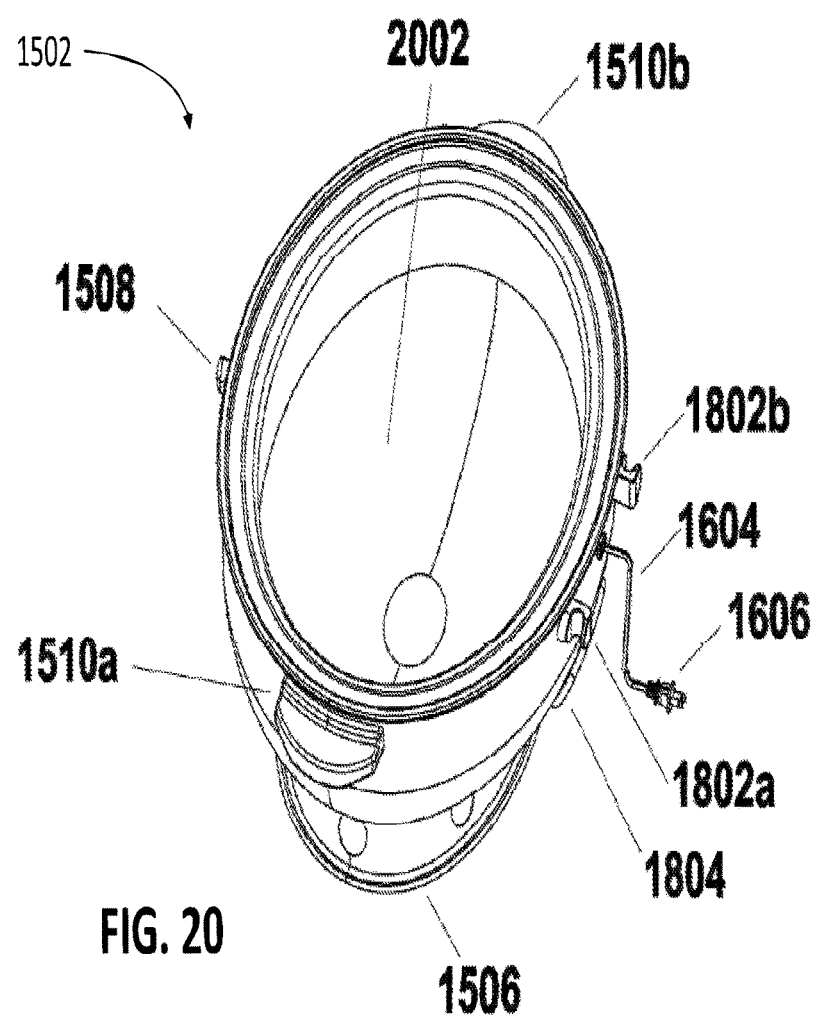
FIG. 20 shows a perspective view of an interior portion of a dome lid of an invertible roasting oven in an inverted position as disclosed herein and in accordance with various embodiments.

With broad reference to FIGS. 19-21, the dome lid 1502 is shown, from several perspectives and views, in an inverted position and disposed within the cradle 1506. As shown with respect to each, and with particular attention to FIG. 20, the dome lid 1502 may include an interior portion or heating chamber 2002. A variety of food products, such as ingredients for gravies, broths, sauces, dressings, casseroles, and the like may be placed within the interior portion 2002 of the dome lid 1502 when the dome lid 1502 is disposed in an inverted position within the cradle 1506. Thus, as described above, the dome lid 1502 of the IRO 1500 may be inverted and placed within the cradle 1506, such that the IRO 1500 is capable of cooking a variety of food products, such as, for example, a variety of side dishes. The IRO 1500 may be inverted, so that it operates, rather than as a roasting oven in a non-inverted, or first, mode of operation, but as a slow cooker or saucepan, in an inverted, or second, mode of operation. The IRO 1500 is therefore capable of functioning as a roasting oven in a non-inverted or upright position and as a slow cooker or saucepan in an inverted position.

Figure 22:
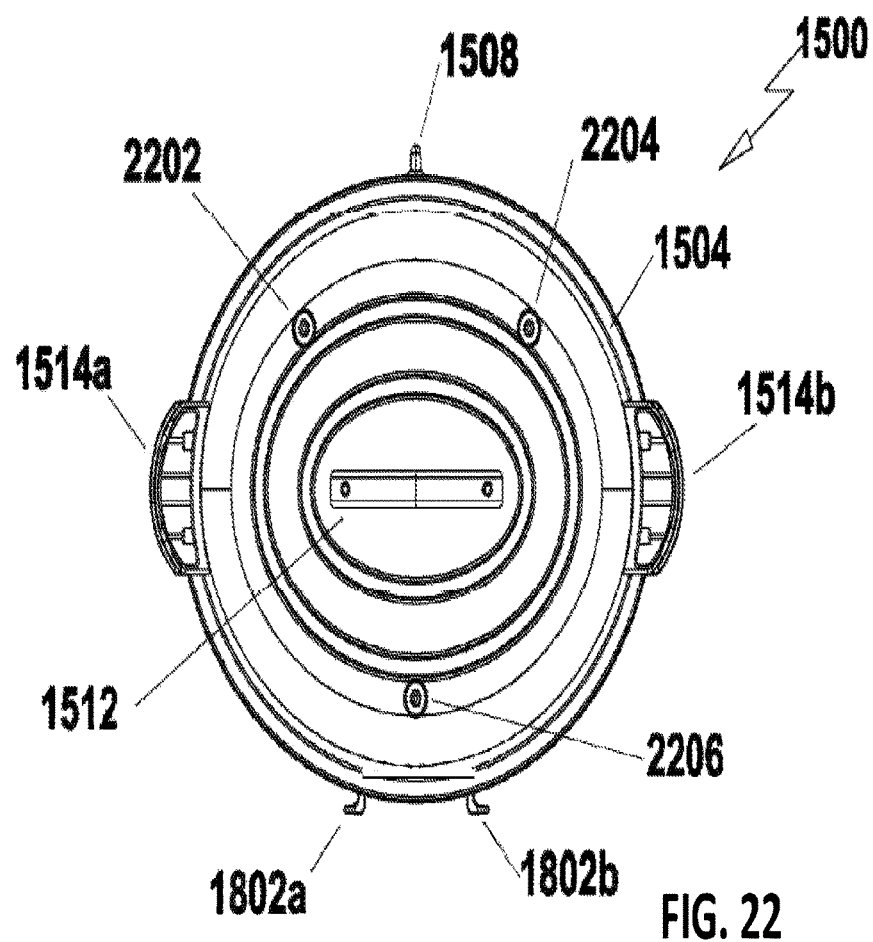
FIG. 22 shows a top view of an invertible roasting oven as disclosed herein and in accordance with various embodiments.

Referring to FIG. 22, a top view of the IRO 1500 is shown. In various embodiments, the base pan 1504 may include the central handle 1512, the side handles 1514*a* and 1514*b*, and a plurality of feet, e.g., feet 2202, 2204, and/or 2206. The central handle 1512 and the side handles 1514*a* and 1514*b* may be coupled to the base pan 1504, such that the IRO 1500 and/or the base pan 1504 may be lifted or moved. In various embodiments, when the dome lid 1502 is inverted such that the IRO 1500 is used as a deep well cooker, the need for the dome lid 1502 to rest in a vertical position, as described elsewhere herein, may not exist, and the fixed leg 1802 and fold-out leg 1804 may be excluded from the dome lid 1502.

Figure 23:
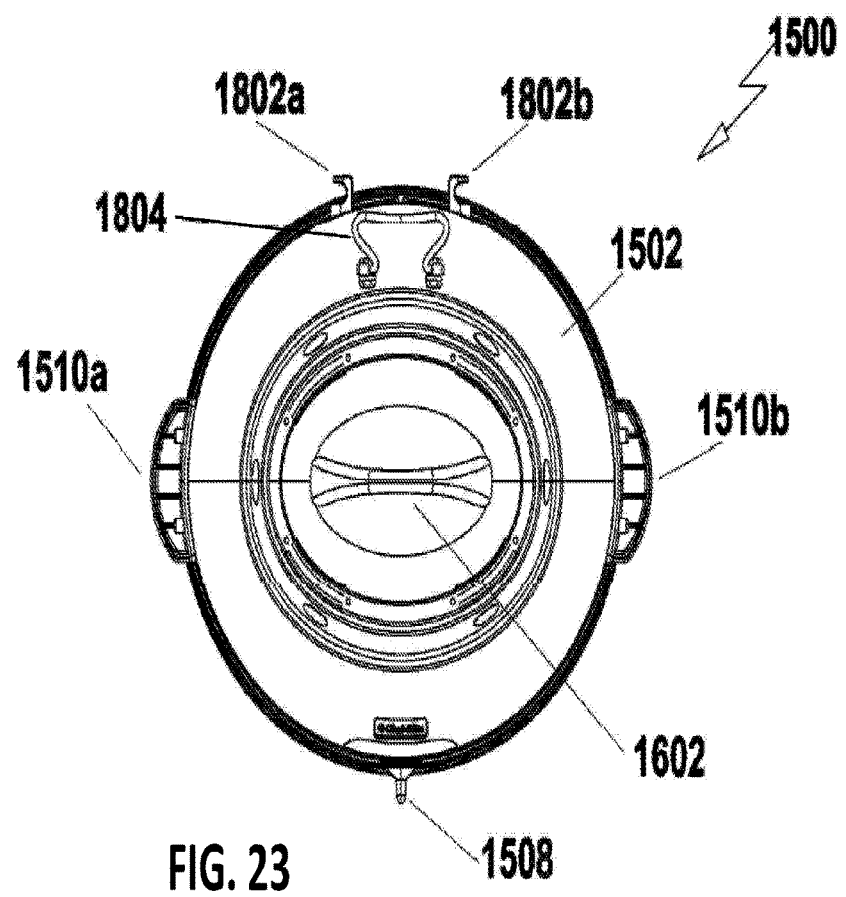
FIG. 23 shows a bottom view of an invertible roasting oven as disclosed herein and in accordance with various embodiments.

FIG. 23 shows a bottom view of the IRO 1500. As described above, the IRO 1500 may include the dome lid 1502 and the central handle 1602. The dome lid 1502 may further include the side handles 1510*a* and 1510*b*, which may be coupled to the dome lid 1502 for lifting or moving all or a portion of the IRO 1500. In addition, as shown, the fixed leg 1802 may include a two part or two-piece support structure, comprising two members, 1802*a* and 1802*b*, where each member 1802*a* and 1802*b* is separated by a distance along and external perimeter of the dome lid 1502. Such a spacing may lend added stability to the dome lid 1502 when it is situated in a vertical or standing position. The members 1802*a* and 1802*b* may be used to wind the power cable 1604 about the dome lid 1502.

Figure 24:
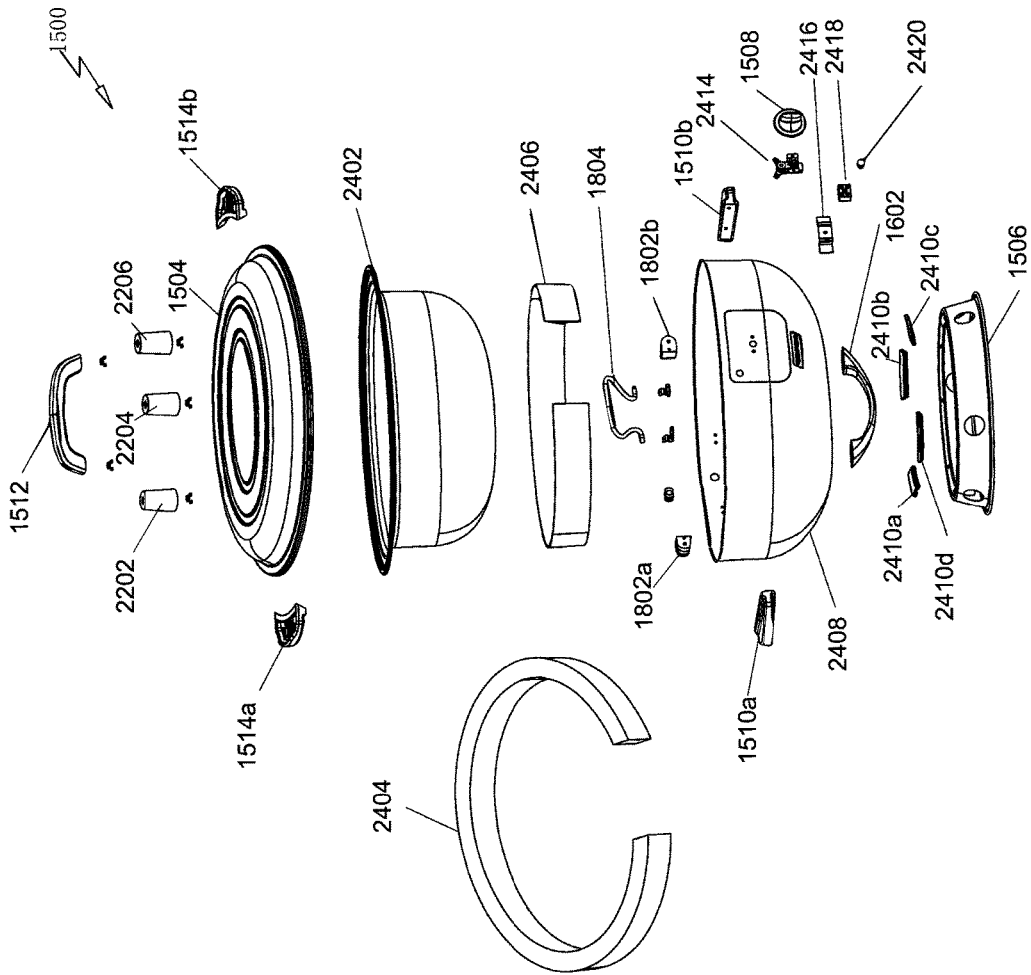
FIG. 24 shows an exploded view of an invertible roasting oven as disclosed herein and in accordance with various embodiments.

With reference to FIG. 24, an exploded view of the IRO 1500 is shown. From the top down, in an inverted configuration, the IRO 1502 may include the central handle 1512, the feet 2202, 2204, and/or 2206, the base pan 1504, the side handles 1514*a* and 1514*b*, an inner wall lid (or "inner wall") 2402, an insulating material 2404, a heating element 2406, the fold-out leg 1804, the fixed leg members 1802*a* and 1802*b*, an outer wall lid (or "outer wall") 2408, the side handles 1510*a* and 1510*b*, a temperature control system 2412 comprising the temperature control knob 1508 and the temperature controller 2414, a central handle 1602, one or more cradle inserts 2410*a*-2410*d*, a ceramic holder 2416, a ceramic connector 2418, a light cover 2420, and/or the cradle 1506. The heating element may include, as described above, any suitable electrical heating element.

As shown and as described above with reference to the roasting oven 100, the heating element 2406 may generally extend within the dome lid 1502 from a first edge of the dome lid 1502 to a second edge of the dome lid 1502, such that the heating element 2406 extends along an entire (or substantially an entire) perimeter of the dome lid 1502. The heating element 2406 is therefore, in various embodiments, radially disposed about all or a portion of the dome lid 1502. However, in various embodiments, the heating element 2406 may extend within any portion of the dome lid 1502 that is less than the entire perimeter of the dome lid 1502.

Moreover, as shown, the heating element 2406 may extend within the dome lid 1502 (i.e., between an exterior surface of the inner wall lid 2402 and an interior surface of the outer wall lid 2408) as a "belt" or "heating belt" that extends radially within the dome lid 1502 and to a predetermined elevation or height above the base of the dome lid 1502. In other words, the heating element 2406 may include a belt or strip disposed within the dome lid 1502 between the inner wall lid 2402 and the outer wall lid 2408. The heating element 2406 may further extend from a base of the dome lid 1502 to a predetermined height above the base of the dome lid 1502, such that the heating element 2406 is not disposed throughout the entire dome lid 1502.

By way of example and not of limitation, temperature control may include a bimetal strip that is proximate to the inner shell, which senses and controls the temperature inside the dome. The temperature maybe set by turning the shaft of knob to a desired temperature. At the desired temperature, contact points are opened and closed for the heating belt, which causes the heating belt to be turned on and/or off; thereby, maintaining the desired temperature.

As a result of the location of the heating element 2406 within the dome lid 1502, the IRO 1500 may apply heat to the food product (including a top surface of the food product), so that the food product is uniformly roasted and browned, but not scorched by the heating element 2406 during a non-inverted or upright mode of operation (i.e., as described above with reference to the roasting oven 100). The IRO 1500 may be inverted, during a second or inverted mode of operation, to cook a variety of food products, such as gravies, broths, sauces, dressings, casseroles, and other side dishes. More generally, the heating element 2406 may apply heat to the food product placed within the interior portion 2002 of the dome lid 1502, such as might occur, for example, in a slow cooking device or a saucepan. Thus, the IRO 1500 can function as a roasting oven as well as a slow cooking device or saucepan, depending, in essence, upon the orientation or configuration (inverted or non-inverted) of the IRO 1500.

Figure 25:
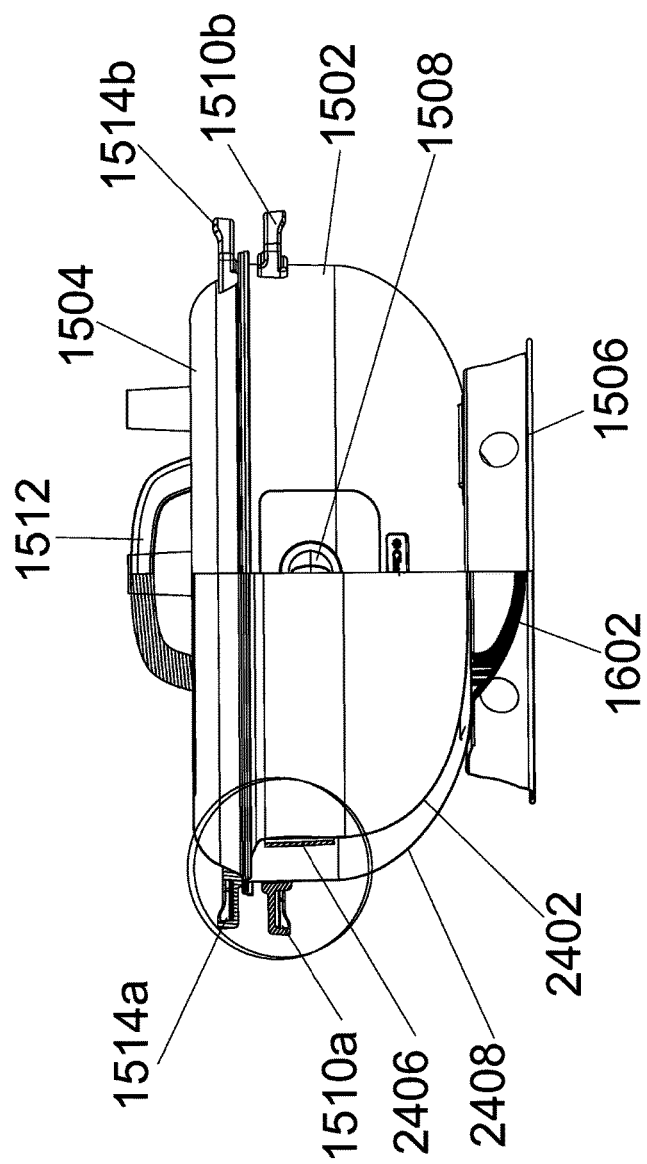
FIG. 25 shows a partial cross-section of an invertible roasting oven as disclosed herein and in accordance with various embodiments.

FIG. 25 shows a partial cross-section of the IRO 1500. As shown, and by way of example and not of limitation, the heating element 2406 may be disposed within the dome lid 1502, between the outer wall lid 2408 and the inner wall lid 2402. More particularly, and as described elsewhere herein, the heating element 2406 may include a "belt" or "strip" that extends radially about a perimeter of the inner wall lid 2402. Furthermore, the central handle 1602 can be locked together with the cradle 1506 to make the dome lid 1502 and cradle 1506 couple solidly together. Any suitable locking mechanism may be used for this purpose, such as one or more tabs or clips, a pressure fit interlocking mechanism, a plurality of tongue-in-groove coupling features, and the like.

Figure 26:
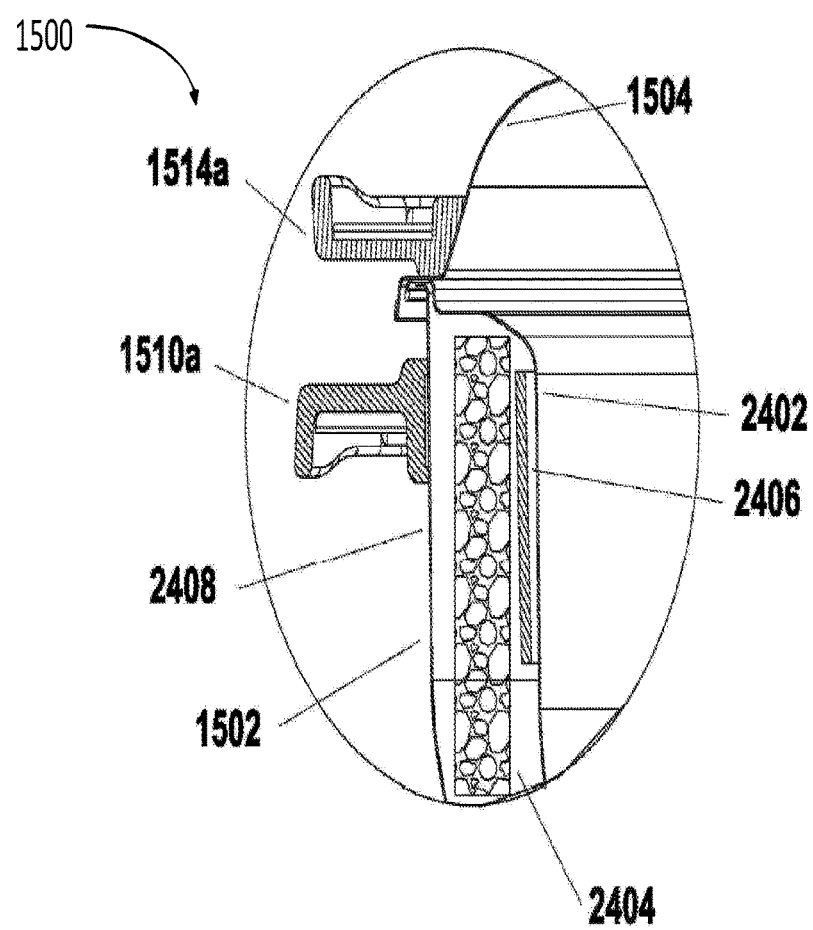
FIG. 26 shows a cutout view of the inner wall and outer wall of a dome lid of an invertible roasting oven as disclosed herein and in accordance with various embodiments.

FIG. 26 shows a cutout view of a portion of the IRO 1500. As shown, and as described above with reference to the roasting oven 100, the inner wall lid 2402 may be joined to the outer wall lid 2408 at a base of the dome lid 1502 to form a chamber within which the heating element 2406 and insulating material 2404 may be disposed. In various embodiments, the inner wall lid 2402 may be joined to the outer wall lid 2406 with a joining mechanism such as a tab or clip. Additionally, the inner wall lid 2402 may be joined to the outer wall lid 2406 by welding, by pressure, by one or more rivets or bolts, by a heat bonding technique, by way of a heat-resistant adhesive, and the like.

In various embodiments, and by way of example and not of limitation, the insulating material 2404 may be radially disposed about the heating element 2406. For instance, the insulating material 2404 may be disposed between the outer wall lid 2408 and the heating element 2406, such that the heat generated by the heating element 2406 is to some extent prevented by the insulating material 2404 from dissipating through the outer wall lid 2408.

Figure 27:
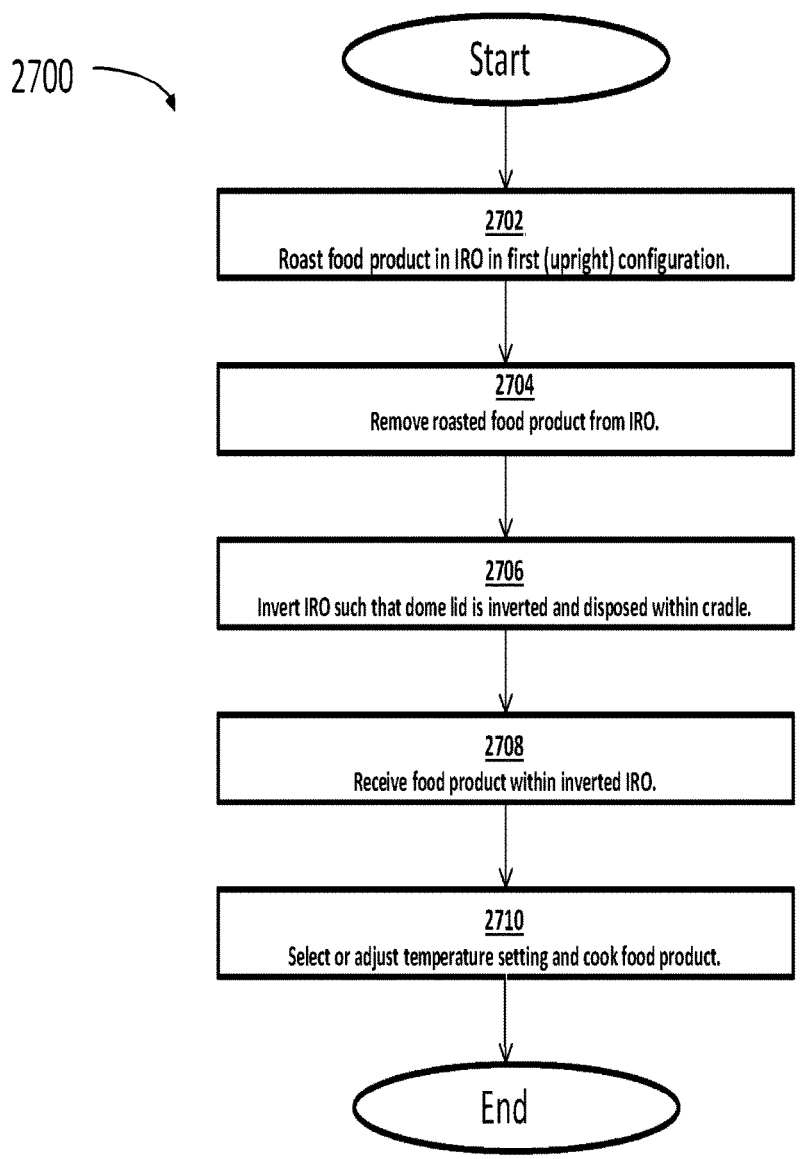
FIG. 27 shows a process for cooking a food product with an invertible roasting oven as disclosed herein and in accordance with various embodiments.

FIG. 27 shows a process 2700 for cooking one or more food products in an IRO 1500. As described herein, a food product, such as a turkey, may be roasted within the IRO 1500 such that the food product is uniformly browned and evenly cooked throughout. The IRO 1500 can roast a food product and may function as a roasting oven in a non-inverted (or upright) mode or configuration, as described with above and with particular reference to FIGS. 1-14 (step 2702). The IRO 1500 may further operate to cook a food product, such as a side dish (e.g., a gravy, a broth, a sauce, a dressing, a casserole, and the like) in an inverted mode or configuration. The IRO 1500 may operate in an inverted mode at any time. However, in various embodiments, the IRO 1500 may operate in an inverted mode after a food product is roasted within the IRO 1500 in a non-inverted mode and removed from the IRO 1500 (step 2704).

For instance, where a food product is roasted within the IRO 1500 and removed, the food product may leave behind various pan drippings or trimmings, which may be left within the IRO 1500 or transferred from the base pan 1504 of the IRO 1500 to the interior portion 2002 of the dome lid 1502, after the dome lid 1502 has been inverted and placed within the cradle 1506 (step 2706). One or more food products may be placed within the dome lid 1502 of the inverted IRO 1500 as well (step 2708).

A cooking temperature or cooking setting may be selected, such as, for example, by way of the temperature control knob 1508 (step 2710). As described above, the temperature control knob 1508 may permit selection of a desired doneness or brownness (e.g., where the IRO 1500 is operating in a non-inverted mode). The temperature control knob 1508 may further permit selection of a desired doneness or temperature in an inverted mode of operation, such as, for example, "low," "medium," "high," and the like. Thus, the temperature control system 2412 may operate as a multi-modal temperature control component depending, in various embodiments, upon the mode or configuration of the IRO 1500.

The IRO 1500 may therefore operate in an upright or non-inverted mode as well as in an inverted mode. In the non-inverted mode, the IRO 1500 may operate to roast a food product, as described herein, such that the surfaces of the food product are uniformly browned (and not scorched) as well as such that the food product is evenly cooked throughout.

In an inverted mode, the IRO 1500 may operate as a more traditional slow cooking device or saucepan to cook a food product placed within the interior portion 2002 of the dome lid 1502. The food product can include pan drippings or trimmings resulting from the roasting process described above and with respect to the non-inverted mode of (roasting) operation. For example, pan drippings collected in the base pan 1504 during the non-inverted mode of operation may be transferred from the base pan 1504 to the dome lid 1502 and simmered within the inverted dome lid 1502 (with other ingredients) to produce a gravy, a broth, or a sauce.

Similarly, the IRO 1500 may operate in an inverted mode to cook any food product which might otherwise be cooked within a slow cooking device or saucepan, such as any type of side dish, any dressing, any casserole, any soup, and the like.

The IRO 1500 therefore includes a multi-modal cooking device or cooking apparatus which can operate in a non-inverted (roasting) mode as well as in an inverted mode. The temperature control knob 1508 of the IRO 1500 can include a multi-modal temperature control component, and may function, depending upon the orientation or configuration of the IRO 1500 (inverted or non-inverted) to select a desired doneness, brownness, temperature, and the like.

The various features and processes described maybe used independently of one another, or maybe combined in various ways. All possible combinations and subcombinations are intended to fall within the scope of this disclosure. In addition, certain method or process blocks or steps maybe omitted in some implementations. The methods described herein are also not limited to any particular sequence, and the blocks or steps relating thereof can be performed in other sequences that are appropriate. For example, described blocks or steps maybe performed in an order other than that specifically disclosed, or multiple blocks or steps maybe combined in a single block or step. The example blocks or steps may be in serial, in parallel, or in some other manner. Blocks or steps maybe added to or removed from the disclosed example embodiments. The example systems and components described herein maybe configured differently than described. For example, elements maybe added to, removed from, or rearranged compared to the disclosed example embodiments.

Conditional language used herein, such as, among others, "can," "could," "might, "may," "e.g.," and the like, unless specifically stated otherwise, or otherwise understood with the context as used, is generally intended to convey that certain embodiments include, while other embodiments do not include, certain features, elements, and/or steps. Thus, such conditional language is not generally intended to imply that features, elements and/or steps are in any way required for one or more embodiment or that one or more embodiments necessary include logic for deciding, with or without author input or prompting, whether these features, elements, and/or steps are included or are be performed in any particular embodiment. The terms "comprising," "including," "having," and the like are synonymous and are used inclusively, in an open-ended fashion, and do not exclude additionally elements, features, acts, operations, and so forth. Also, the term "or" is used in its inclusive (and not in its exclusive sense) so that when used for example, to connect a list of elements, the term "or" means one, some or all of the elements of the list.

While certain embodiments have been described, these embodiments have been presented by way of example only, and are not intended to limit the scope of the disclosures herein. Thus, nothing in the foregoing description is intended to imply that any particular feature, characteristic, step, module, or block is necessary or indispensable. Indeed, the novel methods and systems described herein maybe embodied in a variety of other forms; furthermore, various omission, substitutions and changes in the form of the methods and systems described herein may be made without departing from the spirit of the disclosures herein.

It is to be understood that the detailed description of illustrative embodiments are provided for illustrative purposes. Thus, the degree of software modularity (i.e., the number of software modules) for the transactional system and method presented above may evolve to benefit from the improved performance and lower cost of the future hardware components (e.g., transistors, controllers, processors, and the like) that meet the system and method requirements presented. The scope of the claims is not limited to these specific embodiments or examples. Therefore, various process limitations, elements, details, and uses may differ from those just described, or be expanded on or implemented using technologies not yet commercially viable, and yet still be within the inventive concepts of the present disclosure. The scope of the invention is determined by the following claims and their legal equivalents.

What is claimed is:

1. An invertible roasting oven, the invertible roasting oven comprising:
    a double walled dome lid having an inner and an outer wall;
    a heating element that is disposed within the double walled dome lid between the inner wall and the outer wall;
    a pan that interfaces with the double walled dome lid, the pan configured to function as a base to the double walled dome lid in a first mode of operation and as a cover to the double walled dome lid in a second mode of operation;
    a cradle that receives the double walled dome lid when the cooking apparatus is operating in the second mode of operation; and
    a central handle coupled to an exterior surface of the double walled dome lid and extending axially away from the exterior surface of the double walled dome lid.

2. The invertible roasting oven of claim 1, further comprising a central handle coupled to an exterior surface of the pan and extending axially away from the exterior surface of the pan.

3. The invertible roasting oven of claim 2, the central handle configured to extend into the cradle when the cooking apparatus is operating in the second mode of operation.

4. The invertible roasting oven of claim 1, the cradle comprising a convex receiving structure.

5. The invertible roasting oven of claim 1, the cradle comprising at least one vent.

6. The invertible roasting oven of claim 1, the heating element extending circumferentially about the inner wall of the double walled dome lid and within the double walled dome lid.

7. The invertible roasting oven of claim 1, the heating element disposed substantially about a perimeter of the inner wall, the heating element separated from the outer wall by an insulating material.

8. A cooking apparatus, the cooking apparatus comprising:
    a double walled dome lid having an inner wall and an outer wall, the inner wall joined to the outer wall at a lip of the double walled dome lid;
    a temperature controlling component;
    a heating element that is disposed within the double walled dome lid between the inner wall and the outer wall, the heating element electrically coupled to the temperature controlling component, the temperature controlling component configured to receive a cooking input that causes the heating element to heat the double walled dome lid;
    a pan that interfaces with the double walled dome lid at the lip of the double walled dome lid, the pan configured to function as a base to the double walled dome lid in a first mode of operation and as a cover to the double walled dome lid in a second mode of operation;
    a removable tray configured to sit within the pan in the first mode of operation and to be removed from the pan in the second mode of operation;
    a cradle that receives the double walled dome lid when the cooking apparatus is operating in the second mode of operation; and
    a central handle coupled to an exterior surface of the double walled dome lid and extending axially away from the exterior surface of the double walled dome lid.

9. The cooking apparatus of claim 8, further comprising a central handle couple to an exterior surface of the pan and extending axially away from the exterior surface of the pan.

10. The cooking apparatus of claim 9, the central handle configured to extend into the cradle when the cooking apparatus is operating in the second mode of operation.

11. The cooking apparatus of claim 8, the cradle comprising a convex receiving structure.

12. The cooking apparatus of claim 8, the cradle comprising at least one vent.

13. The cooking apparatus of claim 8, the heating element extending circumferentially about the inner wall of the double walled dome lid and within the double walled dome lid.

14. The cooking apparatus of claim 8, the heating element disposed substantially about a perimeter of the inner wall, the heating element separated from the outer wall by an insulating material.

* * * * *